(12) United States Patent
Cho et al.

(10) Patent No.: US 6,567,285 B2
(45) Date of Patent: May 20, 2003

(54) SWITCHING POWER SUPPLY UNIT

(75) Inventors: Hisanori Cho, Tokyo (JP); Masahiko Hirokawa, Tokyo (JP); Yasuhiro Murai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/001,837

(22) Filed: Nov. 23, 2001

(65) Prior Publication Data

US 2002/0054498 A1 May 9, 2002

Related U.S. Application Data

(63) Continuation of application No. PCT/JP01/02256, filed on Mar. 22, 2001.

(30) Foreign Application Priority Data

Mar. 23, 2000 (JP) ........................................ 2000-082891
Mar. 27, 2000 (JP) ........................................ 2000-087674

(51) Int. Cl.⁷ ........................ H02M 7/5387; H02M 7/44
(52) U.S. Cl. ............................ 363/132; 363/98; 363/17
(58) Field of Search ............................... 363/132, 131, 363/97, 98, 95, 17, 20

(56) References Cited

U.S. PATENT DOCUMENTS

| | | | |
|---|---|---|---|
| 4,864,479 A | | 9/1989 | Steigerwald et al. |
| 5,245,520 A | * | 9/1993 | Imbertson .................... 363/17 |
| 5,291,384 A | * | 3/1994 | Mammano et al. ........... 363/17 |
| 5,373,432 A | * | 12/1994 | Vollin et al. .................. 363/16 |
| 5,438,498 A | * | 8/1995 | Ingemi ......................... 363/17 |
| 5,864,471 A | * | 1/1999 | Kammiller et al. ........... 363/17 |
| 5,875,103 A | * | 2/1999 | Bhagwat et al. .............. 363/17 |
| 6,252,782 B1 | * | 6/2001 | Akashi et al. ................ 363/17 |

FOREIGN PATENT DOCUMENTS

| | | |
|---|---|---|
| JP | 62-44071 | 2/1987 |
| JP | 7-222444 | 8/1995 |
| JP | 9-331677 | 12/1997 |

* cited by examiner

*Primary Examiner*—Rajnikant B. Patel
(74) *Attorney, Agent, or Firm*—Cohen, Pontani, Lieberman & Pavane

(57) ABSTRACT

A switching power supply unit capable of adjusting the inductance value of a resonance circuit and outputting a rated output voltage regardless of any fluctuation in an input voltage and a load. The switching power supply unit comprises first to fourth switching elements 11–14 connected with each other in a bridge connection. A diode 21–24 having a reverse polarity and a capacitor 31–34 are disposed between main electrodes of each of the switching elements. A first winding 53 of a transformer 51 is connected between first and second connection points 91, 92. An inductor 41 is inserted into a path ranging from the first connection point 91 through the first winding 53 to the second connection point 92, and forms a resonance circuit in conjunction with the capacitors 31–34. The inductance value L2 of the inductor 41 is arranged to provide the output voltage Vout of an output circuit 60 greater than or equal to the rated output voltage Vout (nom), in a minimum input voltage Vin (mm), a maximum output current Iout (max), and a switching phase-difference f of zero.

10 Claims, 22 Drawing Sheets

SWITCHING POWER SUPPLY UNIT

This application is a Continuation patent application of International Application PCT/JP01/02256 (not published in English), filed on Mar. 22, 2001.

TECHNICAL FIELD

The present invention relates to a switching power supply unit.

PRIOR ART

Heretofore, various types of switching power supply units have been known. One such example includes a phase-shifting full-bridge type switching power supply unit as disclosed in the U.S. Pat. No. 4,864,479.

The phase-shifting full-bridge type switching power supply unit uses four switching elements for a switching circuit. These switching elements are connected to each other in a bridge connection. One pair of connection points originated from the bridge connection forms DC voltage input ends, and the other pair of connection points form switching output ends. A DC power supply is electrically connected to the pair of DC voltage input ends, and a primary winding of a transformer is connected to the pair of switching output ends. An output circuit is connected to the secondary winding of the transformer. A switching output yielded at a secondary winding of the transformer is rectified and smoothed by the output circuit to provide a DC output voltage.

In a switching operation, the four bridge-connected switching elements are driven with the same ON-width and frequency. The four switching elements are on-off controlled by a control circuit to provide a simultaneous ON-period for each of two pairs of the switching elements. According to the switching operation of two sets each composed of either two of the switching elements having the simultaneous ON-period, the direction of a current passing through the primary winding of the transformer is bi-directionally changed to excite the transformer.

In this case, the four switching elements are adequately combined into the two sets to allow the switching elements to be driven in a timing at which the DC voltage input end connected with the DC power source can avoid to be electrically short-circuited in any switching operation.

Moreover, in each set of the two switching elements having the simultaneous ON-period, a switching phase-difference between the two switching elements is controlled according to an output-voltage detection signal or the like to stabilize the output voltage.

Each of the four switching elements includes a pair of main electrodes, and a capacitor is connected between the main electrodes. A resonance circuit is formed by this capacitor and a leakage inductance of the transformer. By using the resulting resonance characteristics, the four switching elements can be operated in a zero-volts switching (hereinafter referred to as "ZVS").

On the other hand, in such switching power supply units, an input voltage inputted from the DC power source and/or the level of a load to be connected to the unit can fluctuate. However, the switching power supply unit is required to output a rated output voltage, regardless of any fluctuation in the input voltage and/or the load. The switching power supply unit is also desired to achieve the ZVS so as to reduce a switching loss, regardless of any fluctuation in the input voltage and/or the load. The output of the rated output voltage and the ZVS has a close relationship with the inductance value of the resonance circuit. Thus, one effective means for achieving the ZVS is to adjust the inductance value of the resonance circuit adequately.

However, in the above conventional techniques, the leakage inductance of the transformer is used as the inductor of the resonance circuit. This involves a problem of the difficulty in adjusting the inductance value of the resonance circuit.

DISCLOSURE OF THE INVENTION

It is therefore an object of the present invention to provide a switching power supply unit capable of adjusting the inductance value of a resonance circuit thereof.

It is another object of the present invention to provide a switching power supply unit capable of outputting a rated output voltage regardless of any fluctuation in an input voltage and a load.

It is still another object of the present invention to provide a switching power supply unit capable of serving as a foundation for achieving the ZVS regardless of any fluctuation in an input voltage and a load.

In order to achieve the aforementioned objects, a switching power supply unit according to the present invention comprises a switching circuit, a transformer, an output circuit, and an inductor. The switching circuit includes first, second, third and fourth switching elements, a diode, and a capacitor. Each of the switching elements includes a pair of main electrode. Respective ones of the main electrodes of the first and second switching elements are connected to each other to form a first connection point. Respective ones of the main electrodes of the third and fourth switching elements are connected to each other to form a second connection point. The other main electrode of the first switching element and the other main electrode of the third switching element are connected to each other to form a third connection point. The other main electrode of the second switching element and the other main electrode of the fourth switching element are connected to each other to form a fourth connection point. In each of the switching elements, the third and fourth connection points are led to pared DC voltage input ends, respectively, so as to allow a DC voltage to be applied with a unidirectional polarity between the pair of main electrodes.

In each of the first, second, third and fourth switching elements, the diode is disposed with a reverse polarity between the main electrodes to have a forward direction opposite to the above polarity. The capacitor is disposed between the main electrodes in each of the first, second, third and fourth switching elements.

The transformer includes first and second windings. The first winding is connected between the first and second connection points. The output circuit rectifies and smoothes a switching output yielded at the second winding of the transformer to form an output voltage.

The control circuit controls a switching phase-difference between the first and fourth switching elements or a switching phase-difference between the second and third switching elements to provide a simultaneous ON-period for either two of the switching elements, so as to stabilize the output voltage of the output circuit. The inductor is inserted in a path ranging from the first connection point through the first winding to the second connection point to form a resonance circuit in conjunction with the capacitor. The inductance value of the inductor is arranged to provide the output voltage of the output circuit larger than or equal to a rated value when the input voltage has a minimal value, the output current having a maximum value and the switching phase-difference being zero.

In a switching operation, the bridge-connected first, second, third and fourth switching elements are driven with the same ON-width and frequency. According to the switching operation of two sets each composed of either two of the switching elements having the simultaneous ON-period, the direction of a current passing through the first winding of the transformer is alternately changed to excite the transformer.

The switching output yielded at the second winding of the transformer is rectified and smoothed by the output circuit and is output as a DC output voltage.

The first, second, third and fourth switching elements are combined and driven at a timing so as to prevent the DC voltage input end connected with the DC power source from being electrically short-circuited in any stage of the switching operation. Further, in each set of the two switching elements having the simultaneous ON-period, the switching phase-difference caused between the two switching elements is controlled according to an output-voltage detection signal or the like to stabilize the output voltage.

The switching circuit includes the capacitor which is disposed between the main electrodes in each of the first, second, third and fourth switching elements. Moreover, a switching power supply unit according to the present invention comprises the inductor which is inserted in the path ranging from the first connection point through the first winding to the second connection point. Thus, a switching power supply unit according to the present invention can operate the first, second, third and fourth switching elements with the ZVS by using resonance characteristics of the resonance circuit formed by the capacitor provided in each of the first, second, third and fourth switching elements and the inductance of the inductor.

The inductor forming the resonance circuit is provided independently from the transformer. Thus, the inductance value of the resonance circuit can be readily controlled by adjusting the inductance value of the inductor. The inductance value of the inductor is arranged to provide the output voltage larger than or equal to a rated value of the output circuit when the input voltage has a minimal value, the output current having a maximum value and the switching phase-difference being zero. Therefore, the switching power supply unit of the present invention can output the rated output voltage even if the input voltage goes down to exhibit the minimal input voltage and the output current increases to exhibit the maximum output current. As described above, the inductance value of the resonance circuit can be readily controlled by adjusting the inductance value of the inductor. This also allows the inductance value of the resonance circuit in the switching power supply unit of the present invention to be readily arranged in a certain value for achieving the ZVS at a maximum input voltage and minimum output current.

For the inductor of the switching power supply unit, the present invention discloses a condition of the inductance value for outputting the rated output voltage even at the minimum input voltage and the maximum output current. The present invention also discloses a condition of the inductance value for achieving the ZVS even at the maximum input voltage and the minimum output current.

In the present invention, a variable inductor capable of changing the inductance value in response to the output current may be used as the inductor. According to such a variable inductor, the ZVS operation can be achieved in a wide range of a low load current to a rated load current by appropriately selecting a change characteristic of the inductance value with respect to the change of the output current.

In the present invention, the term "minimum input voltage" means an input voltage value at the time when the output voltage cannot be provided at a minimum value in an output voltage range defined in the specification as gradually reducing the input voltage in a full load state. The term "full load state" herein means a state when the output current exhibits a maximum value in an output current range defined in the specification. The term "maximum input voltage" means an input voltage value at the time when the switching elements cannot be operated with the ZVS as gradually increasing the input voltage in the full load state. The term "maximum output current" means an output current value at the time when the output voltage cannot be maintained at the minimum value in the output voltage range defined in the specification as gradually increasing the output current from the full load state. The term "minimum output current" means an output current value at the time when the switching elements cannot be operated with the ZVS as gradually reducing the output current from the full load state. Further, in the present invention, the term "rated output voltage" means a maximum value or an equivalent value thereto in the output voltage range defined in the specification of the switching power supply unit.

Another objects, features and advantages of the present invention will be apparent from the following detailed description with reference to the accompanied drawings. The accompanied drawings are simply intended to provide examples of the present invention.

BEST MODE FOR CARRYING OUT THE INVENTION

Figure 1:
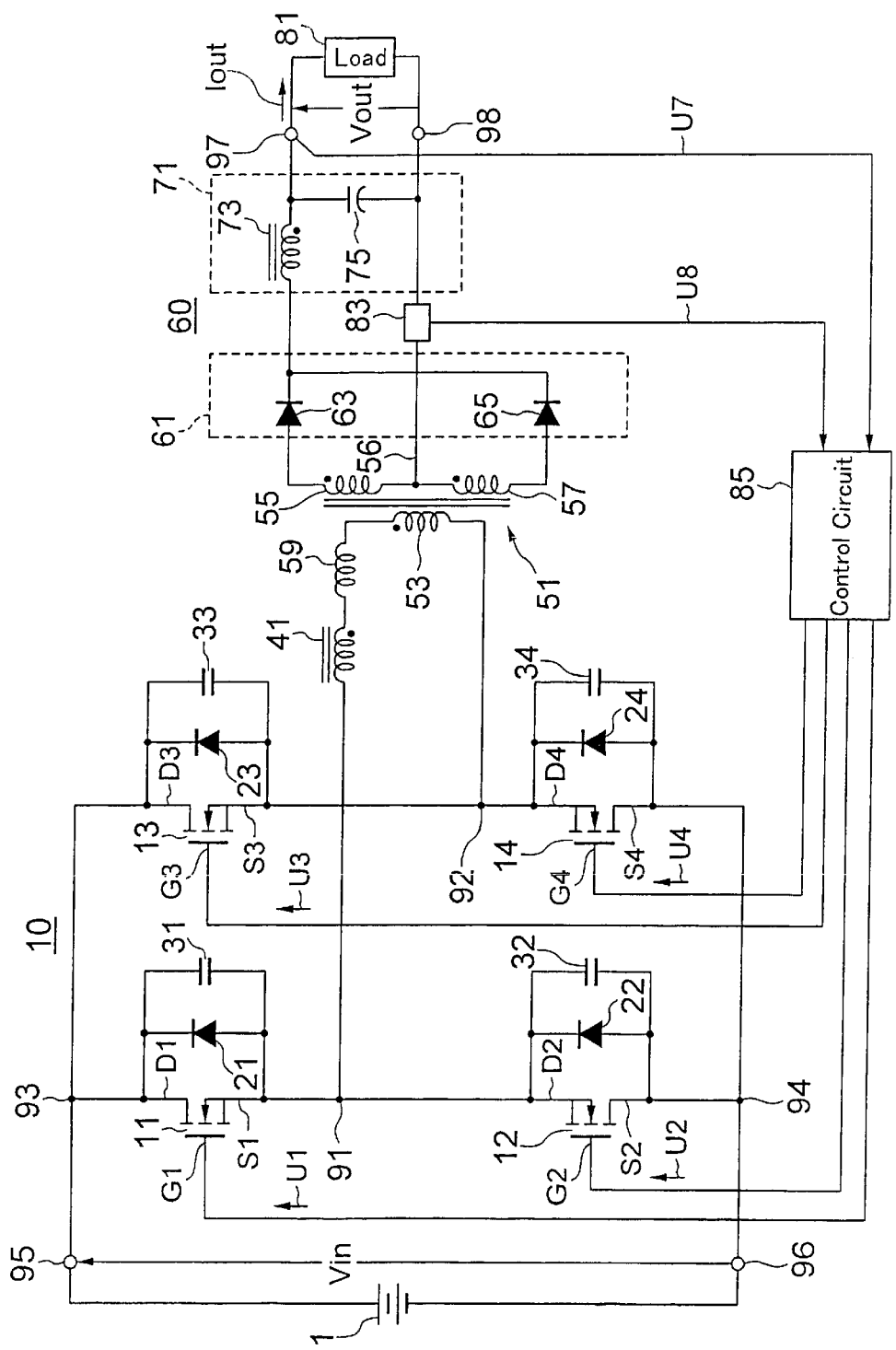
FIG. 1 is an electric circuit diagram of a switching power supply unit according to the present invention.

FIG. 1 is an electric circuit diagram of a switching power supply unit according to the present invention. As illustrated, a switching power supply unit according to the present invention comprises a switching circuit 10, a transformer 51, an inductor 41, and an output circuit 60.

The switching circuit 10 includes first, second, third and fourth switching elements 11, 12, 13, 14, diodes 21, 22, 23, 24, and capacitors 31, 32, 33, 34. In one embodiment, each of the first, second, third and fourth switching elements 11, 12, 13, 14 is comprised of a MOS-FET (Field Effect Transistor). Alternatively, a different type of three-terminal switching element other than the MOS-FET may be used.

The first, second, third and fourth switching elements 11, 12, 13, 14 are connected to each other in a bridge connection. Specifically, a source S1 of the first switching element 11 and a drain D2 of the second switching element 12 are connected to each other to form a first connection point 91. A source S3 of the third switching element 13 and a drain D4 of the fourth switching element 14 are connected to each other to form a second connection point 92. The first and second connection points 91 and 92 are used as a pair of switching output ends.

A drain D1 of the first switching element 11 and a drain D3 of the third switching element 13 are connected to each other to form a third connection point 93. A source S2 of the second switching element 12 and a source S4 of the fourth switching element 14 are connected to each other to form a fourth connection point 94. The third and fourth connection points 93, 94 are led to a pair of DC voltage input ends 95, 96, respectively. A DC source 1 is connected between the DC voltage input ends 95, 96 to which an input voltage Vin is input. In each of the switching elements, the drain and source make up a pair of main electrodes. The DC source 1 is connected to the DC voltage input ends 95, 96 to provide a unidirectional polarity for each of the switching elements, or to provide a polarity for applying a positive voltage to each of the drains and applying a negative voltage to each of the sources.

The diodes 21, 22, 23, 24, are connected in parallel with the capacitors 31, 32, 33, 34, respectively, and each set of the diode and capacitor is provided individually for the first, second, third and fourth switching elements 11, 12, 13, 14. In the first switching element 11, the diode 21 is connected between the source S1 and drain D1 of the first switching element 11 with a reverse polarity. When the first switching element 11 is comprised of the MOS-FET, a parasitic diode included in the MOS-FET can be used as the diode 21. When another three-terminal switching element having no parasitic diode is used as the first switching element 11, the diode 21 may be externally provided between the drain and source of the first switching element 11 with a reverse polarity.

The capacitor 31 is connected between the source S1 and drain D1 of the first switching element 11. When the first switching element 11 is comprised of the MOS-FET, an inherent capacity of the MOS-FET can be used as the capacitor 31. When such a inherent capacity is not sufficient for the capacity or when a three-terminal switching element having no capacity is used as the first switching element 11, the capacitor 31 will be provided externally. The second, third and fourth switching elements 12, 13, 14 are also provided with the diodes 22, 23, 24 and the capacitors 32, 33, 34 as with the aforementioned first switching element 11.

The transformer 51 includes a first winding 53 and second windings 55, 57. The second windings 55, 57 have a center tap 56. In the illustrated embodiment, a turn ratio (n2/n1) between the number of turns n21 of the second winding 55 and the number of turns n1 of the first winding 53 is defined as n. A turn ratio (n22/n1) between the number of turns n22 of the second winding 57 and the number of turns n1 of the first winding 53 is also defined as n. The first winding 53 of the transformer 51 is connected between the first and second connection points 91, 92. In FIG. 1, a leakage inductance of the transformer 51 is indicated by the reference number 59.

The output circuit 60 converts a switching output yielded at the second windings 55, 57 of the transformer 51 into a DC output voltage Vout and outputs it. The reference numbers 97, 98 indicate the DC output ends of the output circuit 60. A load 81 is connected between the DC output ends 97, 98, and the DC output current Iout passes through the load. In this embodiment, the output circuit 60 also includes an output rectifier circuit 61 and an output smoothing circuit 71.

The output rectifier circuit 61 is a full-wave rectifier type and rectifies the switching output yielded at the second windings 55, 57 of the transformer 51. This output rectifier circuit 61 includes two output rectifier diodes 63, 65. These two output rectifier diodes 63, 65 are connected to the second windings 55, 57 of the transformer 51, respectively, so as to form a full-wave rectifier circuit. Specifically, an anode of the output rectifier diode 63 is connected to one end of the second winding 55, an anode of the output rectifier diode 65 being connected to one end of the second winding 57, and a cathode of the output rectifier diode 63 and a cathode of the output rectifier diode 65 are connected to each other.

The output smoothing circuit 71 is a choke-input type, and smoothes the rectified output from the output rectifier circuit 61. This output smoothing circuit 71 includes a choke coil 73 and a smoothing capacitor 75. Specifically, one end of the choke coil 73 is connected to a connection point of the output rectifier diode 63 and the output rectifier diode 65, and the other end of the choke coil 73 is connected to the DC output end 97. The smoothing capacitor 75 is connected between the DC output end 97 connected with the choke coil 73 and the DC output end 98 connected with the center tap 56.

A current detector 83 is inserted between the center tap 56 and a connection point of the smoothing capacitor 75 and the DC output end 98. This current detector 83 outputs a signal U8 corresponding to a current passing through the choke coil 73. The current passing through the current detector 83 is equal to the current passing through the choke coil 73, and the current detector 83 outputs the signal U8 corresponding to the current passing through the choke coil 73. Since a current passing through the first winding 53 is proportional to the output current Iout, the current detector may be inserted in a path ranging from the first connection point through the first winding to the second connection point, differently from the illustrated arrangement. Moreover, the current detector may also be adapted to detect a current flowing from a DC source to the switching circuit, differently from the illustrated arrangement.

In the illustrated embodiment of the present invention, the inductor 41 is inserted into a path ranging from the first connection point 91 through the first winding 53 to the second connection point 92. The inductance value of the inductor 41 is defined as L2.

A variable inductor capable of changing the inductance value L2 in response to the output current Iout may be used as the inductor 41 inserted into the path ranging from the switching output end 91 through the first winding 53 to the switching output end 92. Such a variable inductor is disclosed, for example, in Japanese Patent Laid-Open Publication No. Hei 09-331677.

Figure 2:
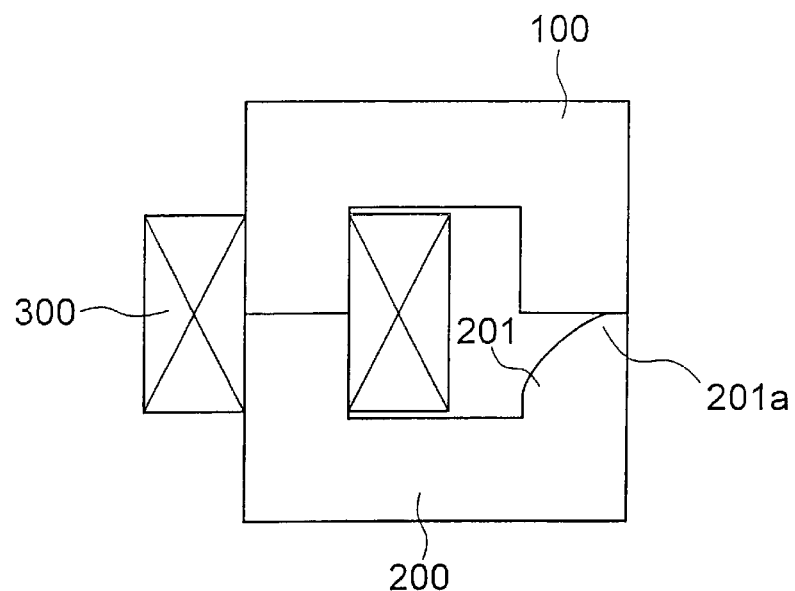
FIG. 2 illustrates one exemplary variable inductor usable in a switching power supply unit according to the present invention.

FIG. 2 illustrates one exemplary variable inductor usable in a switching power supply unit according to the present invention. The variable inductor shown in FIG. 2 is formed by winding a coil 300 around a core composed of core members 100, 200 butted with each other. One end of the core member 200 serves as a gap-adjusting portion 201. By adequately selecting the configuration of the gap-adjusting portion 201, the inductance value is changed in response to a current passing through the coil 300. For example, in the illustrated variable inductor, the gap-adjusting portion 201 of the core member 200 has an inclined surface. The protruded edge 201a of the gap-adjusting portion 201 contacts the core member 100, and the gap between the core member 100 and the inclined surface is increased as getting away from the contact point.

In a range having a small current passing through the coil 300, the magnetic flux yielded by the current passing through the coil 300 mainly goes through the contact portion between the protruded edge 201a of the core member 200 and the core member 100. At this moment, a magnetic circuit composed of the core members 200, 100 provides a maximum magnetic efficiency and a high permeability. Thus, a high inductance value can be obtained.

When the current passing through the coil 300 is increased, a magnetic saturation is caused first at the contact portion between the core member 100 and the protruded edge 201a of the core member 200. Then, as increasing the current passing through the coil 300, the potion having the magnetic saturation is shifted along the inclination of the gap-adjusting portion 201. Thus, as increasing the current passing through the coil 300, the magnetic efficiency and apparent permeability are degraded, and thereby the inductance value is lowered.

A change characteristic of the inductance value in response to the change of the current passing through the coil 300 can be controlled by selecting the configuration of the gap-adjusting portion 201. Thus, the shape or structure of the gap-adjusting portion 201 is designed to obtain a desired change characteristic of the inductance value. Alternatively, another structure may be employed in which a plurality of magnetic materials each having a different permeability are interposed alternately between the butted end surfaces of core members 200, 100. Moreover, the core members 200, 100 may have another shape, such as E-shape or I-shape.

Further, as another way, a variable inductor capable of changing the inductance value by a signal provided from outside may be used as the inductor 41.

Figure 3:
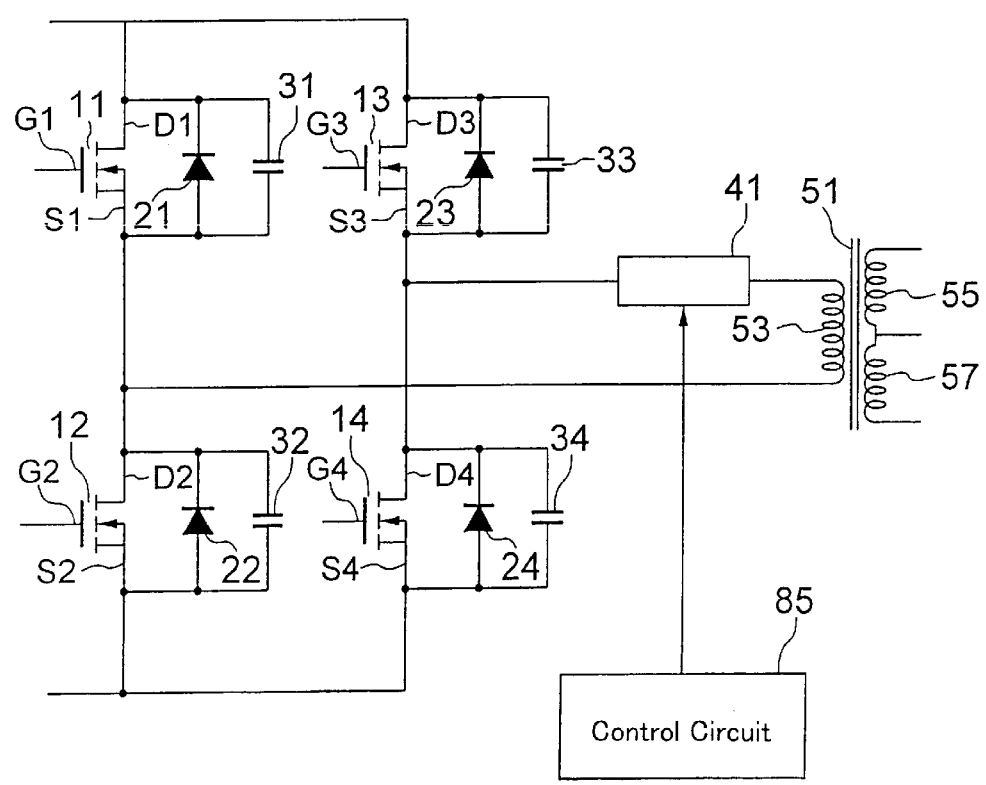
FIG. 3 is a circuit diagram showing another example for varying an inductor, or a circuit diagram showing an extracted part of the switching power supply unit shown in FIG. 1.

FIG. 3 is a circuit diagram showing one embodiment using such a variable inductor. FIG. 3 is a circuit diagram showing an extracted part of the switching power supply unit shown in FIG. 1. In this embodiment, the inductance value of the variable inductor 41 can be changed in response to the output current Iout by a signal from a control circuit 85.

The illustrated switching power supply unit comprises the control circuit 85. The control circuit 85 supplies driving signals U1, U2, U3, U4 to gates G1, G2, G3, G4 of the first, second, third and fourth switching elements 11, 12, 13, 14, respectively, so as to switch them. A signal U7 corresponding to the DC output voltage Vout and a signal U8 corresponding to the current passing through the choke coil 83 are input to the control circuit 85. According to the signal U7 and U8, the control circuit 85 controls each switching phase of the first, second, third and fourth switching elements 11, 12, 13, 14 to stabilize the DC output voltage Vout.

Figure 4:
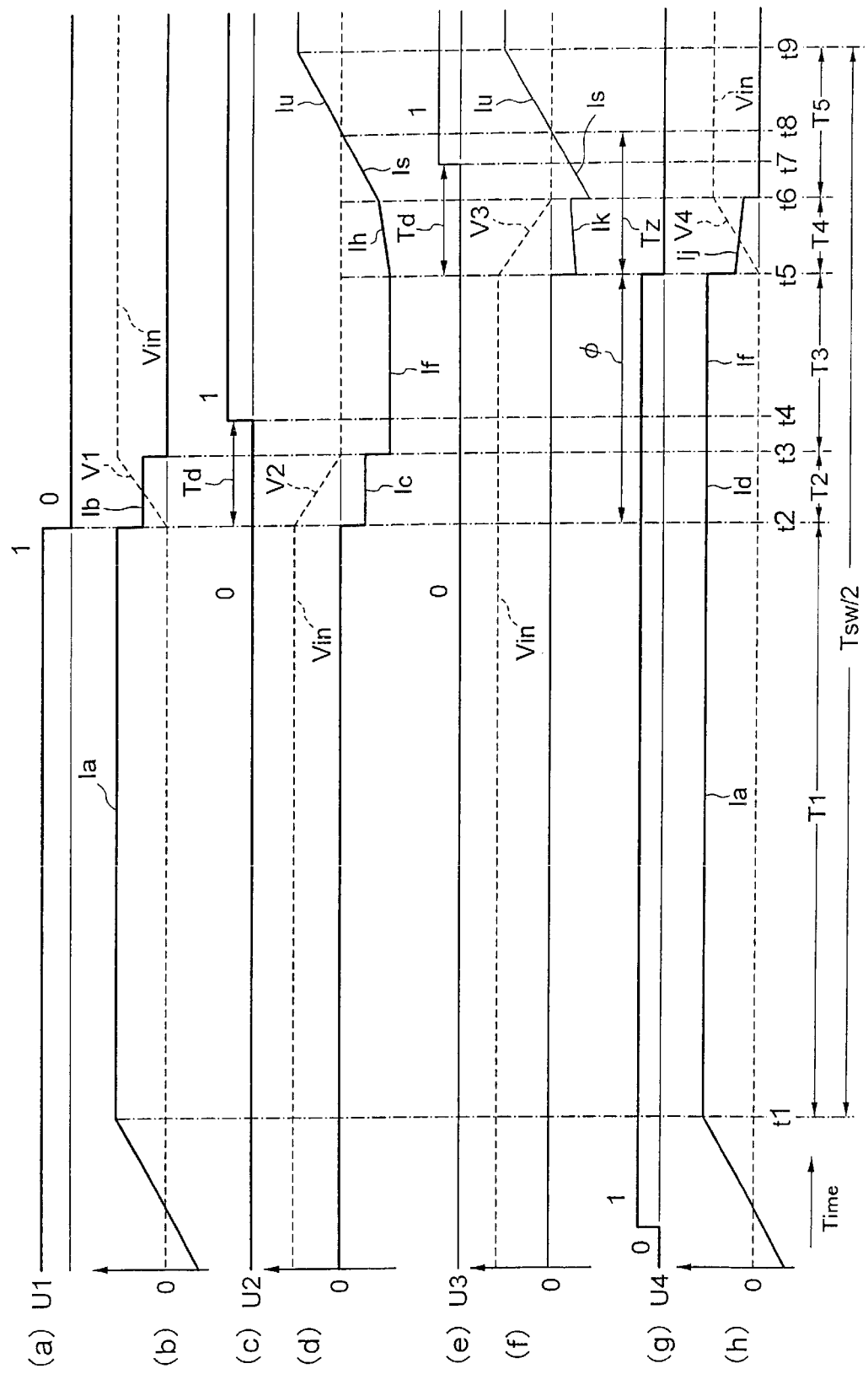
FIG. 4 is an explanatory time chart of a circuit operation of the switching power supply unit shown in FIG. 1.

FIG. 4 is an explanatory time chart of an operation of the switching power supply unit shown in FIG. 1. FIG. 4(a) is a waveform diagram of the driving signal U1 supplied to the switching element 11. FIG. 4(b) shows a waveform of a current passing through the circuit comprised of the switching element 11, the diode 21 and the capacitor 31 connected in parallel with each other by a solid line, and shows a waveform of a voltage between the drain and source of the switching element 11 by a dotted line.

FIG. 4(c) is a waveform diagram of the driving signal U2 supplied to the switching element 12. FIG. 4(d) shows a waveform of a current passing through the circuit comprised of the switching element 12, the diode 22 and the capacitor 32 connected in parallel with each other by a solid line, and shows a waveform of a voltage between the drain and source of the switching element 12 by a dotted line.

FIG. 4(e) is a waveform diagram of the driving signal U3 supplied to the switching element 13. FIG. 4(f) shows a waveform of a current passing through the circuit comprised of the switching element 13, the diode 23 and the capacitor 33 connected in parallel with each other by a solid line, and shows a waveform of a voltage between the drain and source of the switching element 13 by a dotted line.

FIG. 4(g) is a waveform diagram of the driving signal U4 supplied to the switching element 14. FIG. 4(h) shows a waveform of a current passing through the circuit comprised of the switching element 14, the diode 24 and the capacitor 34 connected in parallel with each other by a solid line, and shows a waveform of a voltage between the drain and source of the switching element 14 by a dotted line.

In the switching power supply unit shown in FIG. 1, the bridge-connected first, second, third and fourth switching elements 11, 12, 13, 14 are driven by the driving signals U1, U2, U3, U4 supplied from the control circuit 85 to the control electrodes (gates) G1, G2, G3, G4 so as to have the same ON-width and frequency. According to the switching operation of the first, second, third and fourth switching elements 11, 12, 13, 14, the direction of the current passing through the first winding 53 of the transformer 51 is changed alternately to excite the transformer 51. The switching output yielded at the second windings 55, 57 of the transformer 51 is rectified and smoothed by the output circuit 60, and is then supplied from the output terminals 97, 98 to the load 81 as the DC output voltage Vout.

The first, second, third and fourth switching elements 11, 12, 13, 14 are combined and driven at a timing to prevent the DC voltage input ends 95, 96 connected with DC source 1 from being electrically short-circuited in any state of the switching operation. Specifically, the first and second switching elements 11 and 12 are never turned on simultaneously. Further, the third and fourth switching elements 13 and 14 are never turned on simultaneously. A time interval provided for preventing these switching elements from being simultaneously turned on is referred to as a dead time Td.

The first and fourth switching elements 11, 14 have a simultaneous ON-period, i.e. a time period in which these switching elements are simultaneously turned on. During this simultaneous ON-period, the first winding 53 of the transformer 51 is excited. The first and fourth switching elements 11, 14 are operated with a switching phase-difference f. The simultaneous ON-period is changed by controlling the switching phase-difference f.

The second and third switching elements 12, 13 have the simultaneous ON-period. During the simultaneous ON-period, the first winding 53 of the transformer 51 is excited in the opposite direction of the above excitation. The second and third switching elements 12, 13 are also operated with the switching phase-difference f.

In order to control the output voltage Vout, a choke current signal or a primary current signal and an output voltage detection signal are input to the control circuit 85 to control the switching phase-difference f between the first and fourth switching elements 11, 14 and the switching phase-difference f between the second and third switching elements 12, 13, so as to change the simultaneous ON-period of the first and fourth switching elements 11, 14 and the simultaneous ON-period of the second and third switching elements 12, 13. Thus, the duty ratio of the voltage applied to the first winding 53 of the transformer 51 is changed, and thereby the output voltage Vo is stabilized.

As described above, each of the first, second, third and fourth switching elements 11, 12, 13, 14 includes the capacitors 31, 32, 33, 34, respectively. A switching power supply unit according to the present invention also includes the inductor 41 which is inserted in the path ranging from the switching output end 91 through the first winding 53 to the switching output end 92. Thus, in a switching power supply unit according to the present invention, a resonance circuit is formed by the capacitors 31, 32, 33, 34 provided in the first, second, third and fourth switching elements 11, 12, 13, 14, respectively, the inductance value L2 of the inductor 41, and the leakage inductance value L1 of the transformer 51. By using the resonance characteristic of this resonance circuit, the first, second, third and fourth switching elements 11, 12, 13, 14 can be operated with the ZVS.

More specifically, during the period of the dead time Td between the turn-off of the fourth switching element 14 to the turn-on of the third switching element 13, the resonance circuit is formed by the capacitor 33 provided in the third switching element 13, the capacitor 34 provided in the fourth switching element 14, the inductor 41, and the leakage inductance of the transformer 51. After all of accumulated charge in the capacitor 33 is discharged therefrom by using the resonance action of this resonance circuit, the third switching element 13 can be turned on with the ZVS. This allows a short-circuit loss of the capacitor 33 and an associated noise to be reduced.

Similarly, in the fourth switching element 14, after all of accumulated charge in the capacitor 34 is discharged therefrom, the fourth switching element 14 can be turned on with the ZVS. This allows a short-circuit loss of the capacitor 34 and an associated noise to be reduced.

During the period of the dead time Td between the turn-off of the first switching element 11 to the turn-on of the second switching element 13, the resonance circuit is formed by the capacitor 31 connected to the first switching element 11, the capacitor 32 connected to the second switching element 12, the inductor 41, the exciting inductance and leakage inductance of the transformer 51, and an inductor derived from converting the inductance of the choke coil 73 into that of the primary winding of the transformer 51. After all of accumulated charge in the capacitor 32 is discharged therefrom by using the resonance action of this resonance circuit, the second switching element 12 can be turned on with the ZVS. This allows a short-circuit loss of the capacitor 32 and an associated noise to be reduced.

Similarly, in the first switching element 11, after all of accumulated charge in the capacitor 31 is discharged therefrom, the first switching element 11 can be turned on with the ZVS. This allows a short-circuit loss of the capacitor 31 and an associated noise to be reduced.

In the present invention, the inductor 41 is provided independently from the transformer 51. Thus, the resonance inductance value Lr of the resonance circuit can be readily controlled by adjusting the inductance value L2 of the inductor 41, Practically, since the transformer 51 has the leakage inductance 59, the inductance value Lr of the resonance circuit is a combined value (L1+L2) of the inductance value L2 of the inductor 41 and the leakage inductance value L1 of the transformer 51.

The inductance value L2 of the inductor 41 is arranged to provide the output voltage Vout of the output circuit 60 larger than or equal to the rated output voltage Vout (nom) when the input voltage Vin is the minimum input voltage Vin (min), the output current Iout being the maximum output current Iout (max), and the switching phase-difference f being zero. Thus, a switching power supply unit according to the present invention can output the rated output voltage Vout (nom) even if the input voltage Vin is lowered to exhibit the minimum input voltage Vin (min) and the output current Iout is increased to exhibit the maximum output current Iout (max).

As described above, the inductance value Lr of the resonance circuit can be readily controlled by adjusting the inductance value L2 of the inductor 41. Thus, in a switching power supply unit according to the present invention, the inductance value Lr of the resonance circuit can be readily arranged to achieve the ZVS at the maximum input voltage Vin (max) and the minimum output current Iout (min).

Any variable inductor capable of changing the inductance value in response to the output current may be used as the inductor 41. by adequately selecting the change characteristic of the inductance value with respect to the change of the output current Iout in such a variable inductor 41, the operation with the ZVS can be achieved in a wide range from lower load current to the rated-load current The operation of a switching power supply unit according to the present invention will be described in detail below. it is contemplated that in view of the circuit operation, a switching power supply unit according to the present invention is roughly divided into five stages (periods T1–T5) in terms of the voltage waveform, current waveform and driving signal of each section shown in FIG. 4. With reference to FIG. 4 and FIGS. 5 to 12, each of the stages will be described below.

<First Stage>

Figure 5:
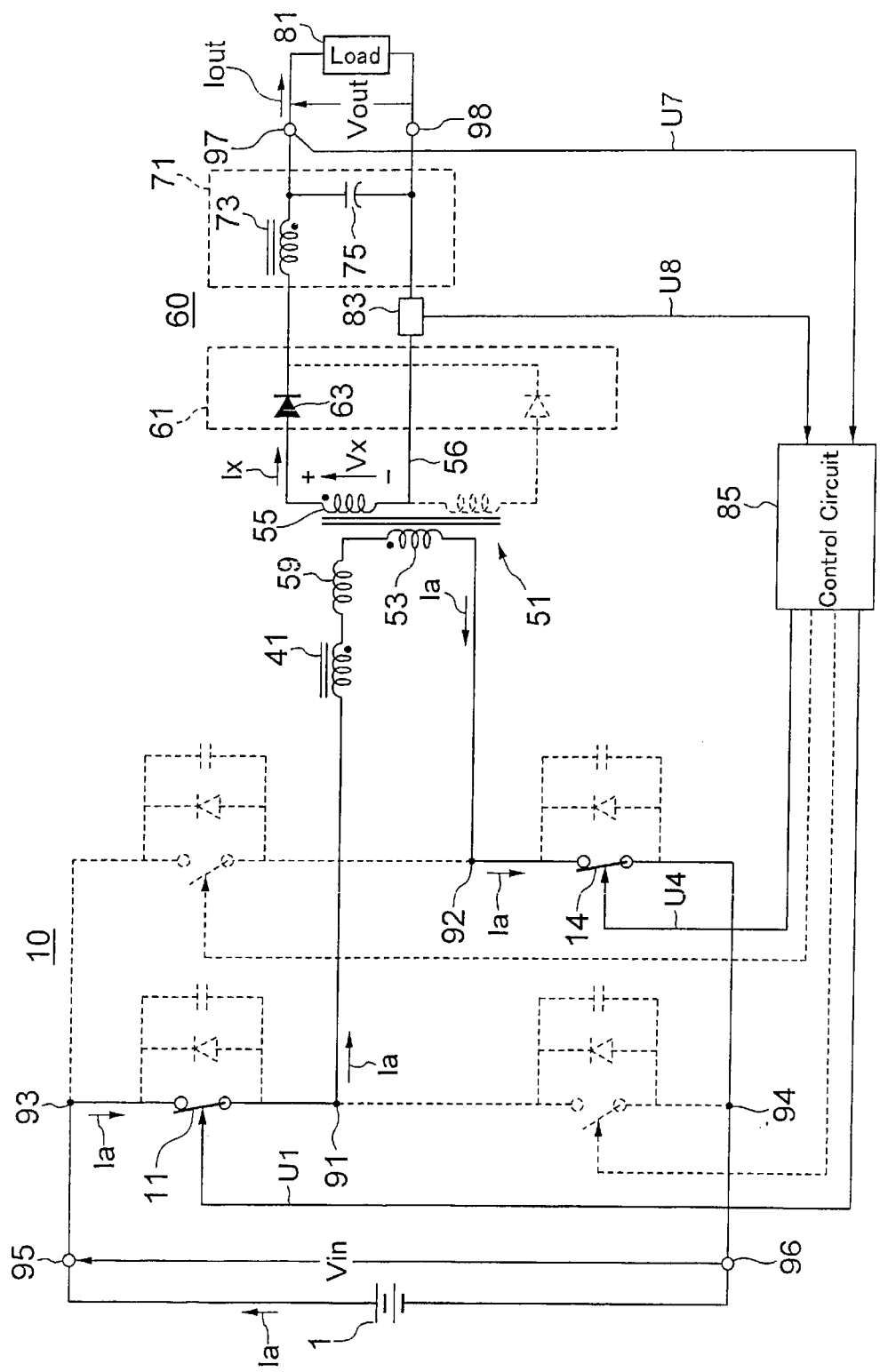
FIG. 5 illustrates an extracted part of the circuit of the switching power supply unit shown in FIG. 1, wherein the extracted part is operated in a first stage.

The first stage corresponds to the period T1 in FIG. 4. FIG. 5 illustrates an extracted part of the circuit in the switching power supply unit shown in FIG. 1, wherein the extracted part is operated in the first stage.

In the first stage, the first and fourth switching elements 11, 14 goes into ON-state, and an electric power is supplied from the input side to the output side of the switching power supply unit. The second and third switching elements 12, 13 are in OFF-state. A current Ia passing through the first and fourth switching elements 11, 14 is defined by the DC output current Iout and the turn ratio n of the transformer 51. The first stage is continued until the first switching element is turned off.

<Second Stage>

Figure 6:
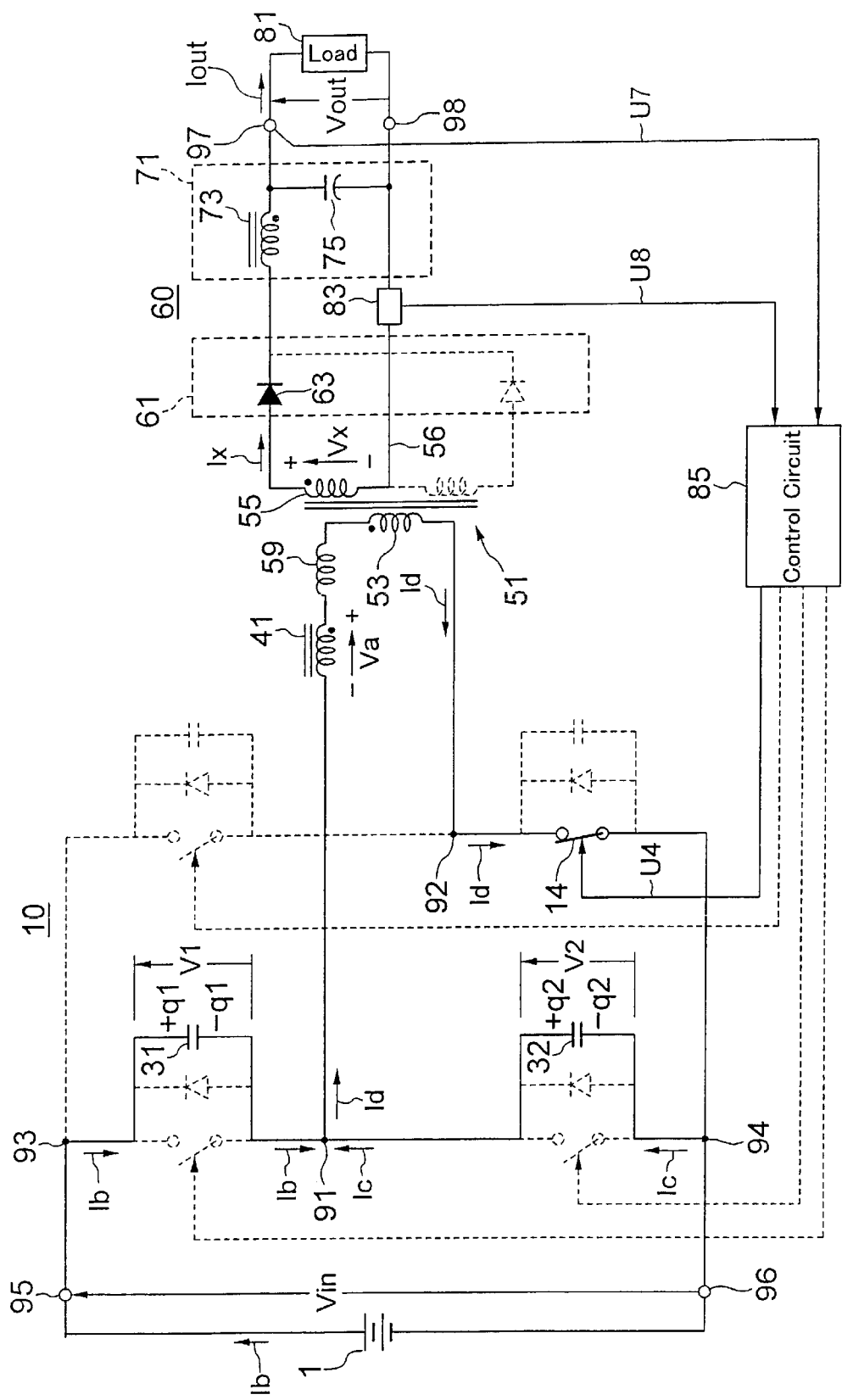
FIG. 6 illustrates an extracted part of the circuit of the switching power supply unit shown in FIG. 1, wherein the extracted part is operated in a second stage.

The second stage corresponds to the period T2 in FIG. 4. FIG. 6 illustrates an extracted part of the circuit operated in the second stage. In the second stage, the capacitor 31 is charged, and an electric charge accumulated in the capacitor 32 of the second switching element 12 is discharged. In the second stage, the first switching element 11 is turned off. The second and third switching elements 12, 13 are kept in OFF-state. The turn-off of the first switching element 11 allows the capacitor 31 to be charged and the electric charge accumulated in the capacitor 32 of the second switching element 12 to be discharged. In the second stage, since the transformer 51 is supplying an electric power, the capacitor 31 is charged by a constant current Ib and the accumulated electric charge of the capacitor 32 is discharged by a constant current Ic. Thus, the voltage V1 between the main electrodes of the first switching element 11 and the voltage V2 between the main electrodes of the second switching element 12 are linearly changed. The second stage is continued until the diode 22 of the second switching element 12 is conducted and the voltage V1 between the main electrodes of the first switching element 11 is clamped to the input voltage Vin.

<Third Stage>

Figure 7:
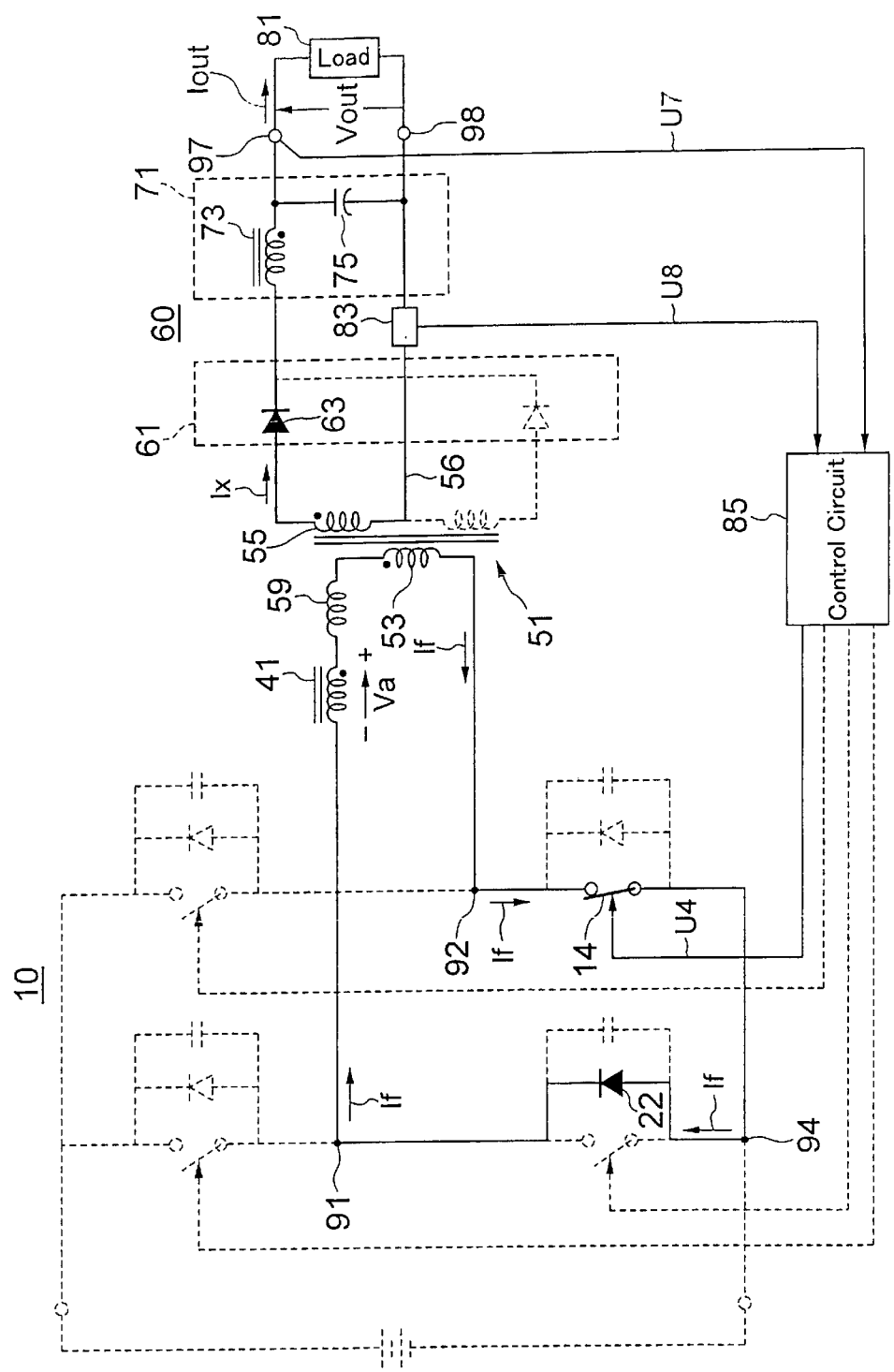
FIG. 7 illustrates an extracted part of the circuit of the switching power supply unit shown in FIG. 1, wherein the extracted part is operated in a third stage.
Figure 8:
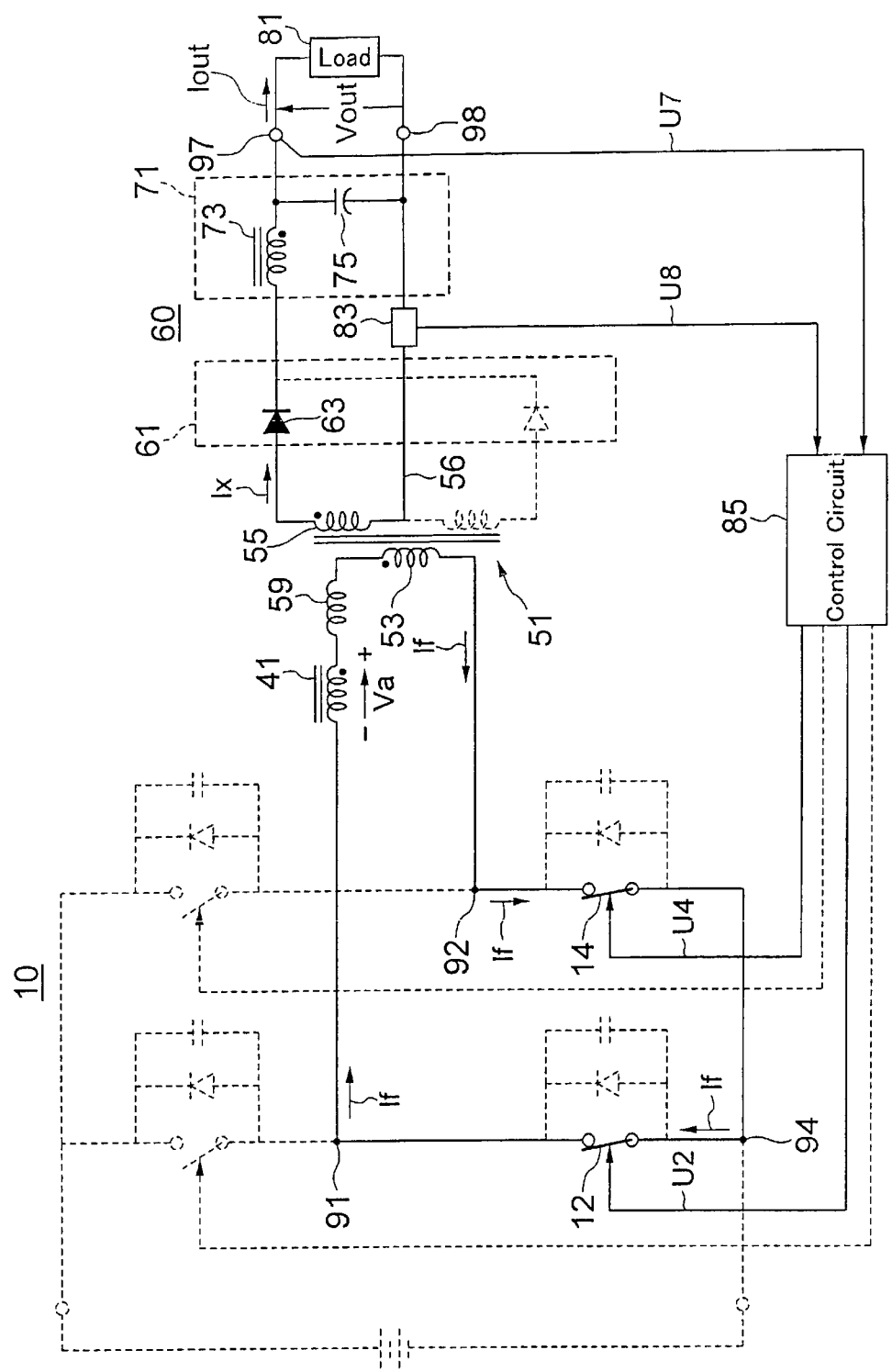
FIG. 8 illustrates an extracted part of the circuit of the switching power supply unit shown in FIG. 1, wherein the extracted part is operated in the third stage.

The third stage corresponds to the period T3 in FIG. 4. Each of FIGS. 7 and 8 illustrates an extracted part of the circuit operated in the third stage. In the third stage, an energy accumulated in the inductor 41 is released through the diode 22 of the second switching element 12 and the fourth switching element 14. Thus, a current If passing through the diode 22 of the second switching element 12 and the fourth switching element 14 is not substantially changed.

As shown in FIG. 8, in the course of the third stage, while the second switching element 12 is turned on and thereby the current If otherwise passing through the diode 22 starts to pass through a channel (between the drain and the source), the fundamental operational state is not changed. The third stage is continued until the fourth switching element 14 is turned off.

<Fourth Stage>

Figure 9:
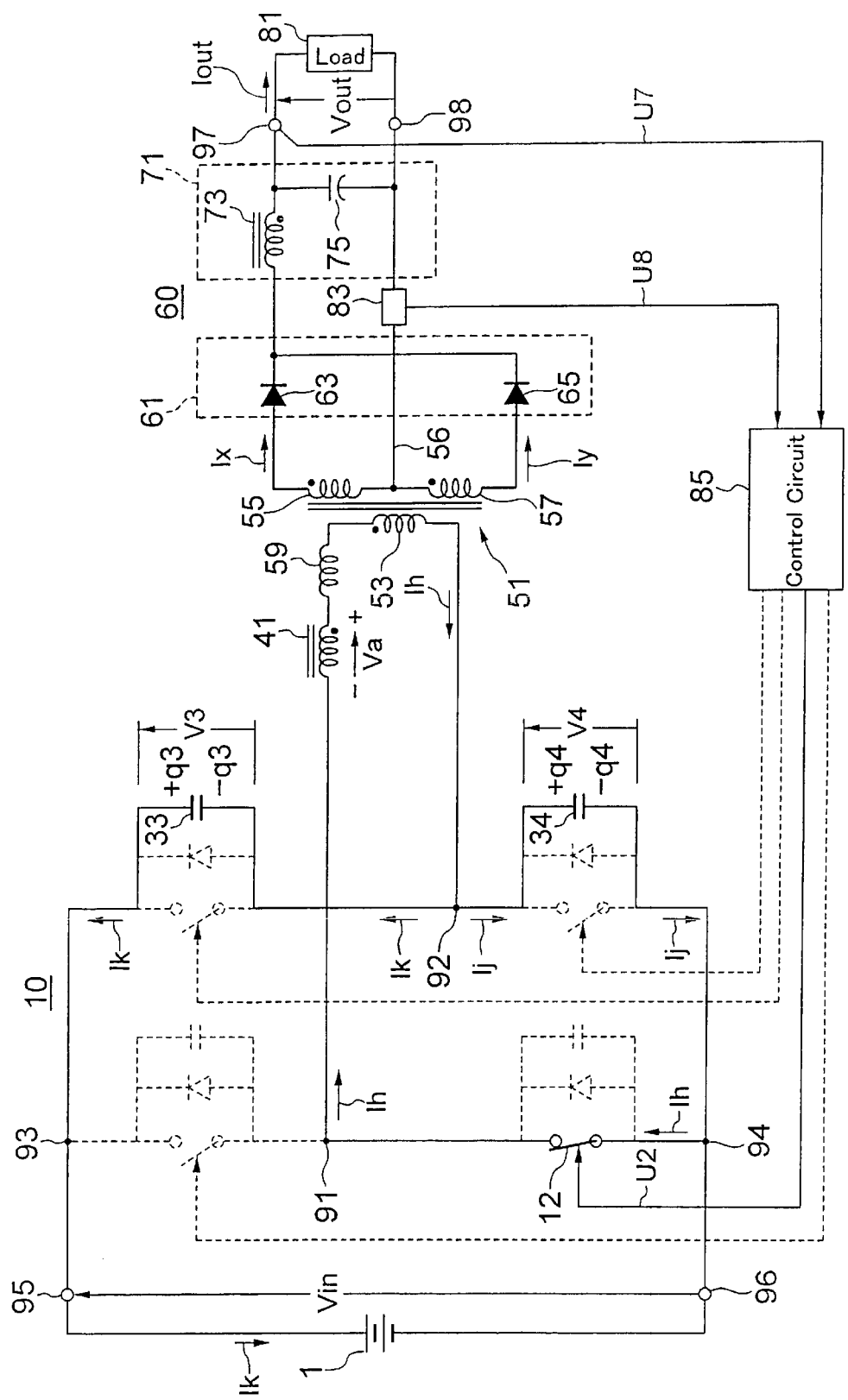
FIG. 9 illustrates an extracted part of the circuit of the switching power supply unit shown in FIG. 1, wherein the extracted part is operated in a fourth stage.

The fourth stage corresponds to the period T4 in FIG. 4. FIG. 9 illustrates an extracted part of the circuit operated in the fourth stage. Differently from the second stage, in the fourth stage, the transformer 51 is short-circuited. Thus, when the fourth switching element 14 is turned off, the resonance is caused between the capacitor 33 of the third switching element 13, the capacitor 34 of the fourth switching element 14, and the inductor 41. This causes each secant change in the current Ik passing through the capacitor 33 of the third switching element 13, the voltage V3 between the main electrodes of the third switching element 13, the current Ij passing through the capacitor 34 of the fourth switching element 14, and the voltage V4 between the main electrodes of the fourth switching element 14. The fourth stage is continued until the diode 23 of the third switching element 13 is conducted.

<Fifth Stage>

Figure 10:
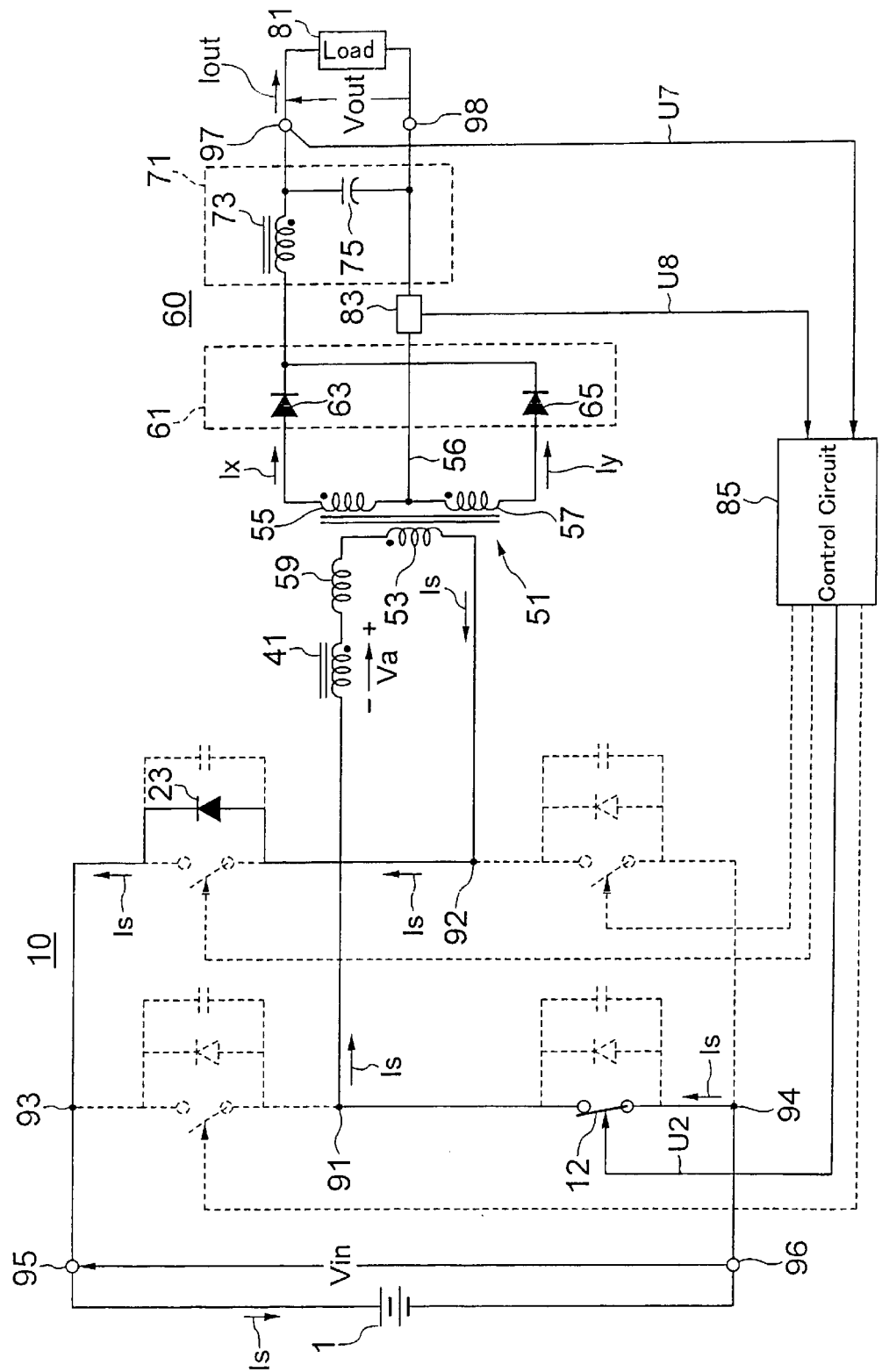
FIG. 10 illustrates an extracted part of the circuit of the switching power supply unit shown in FIG. 1, wherein the extracted part is operated in a fifth stage.
Figure 11:
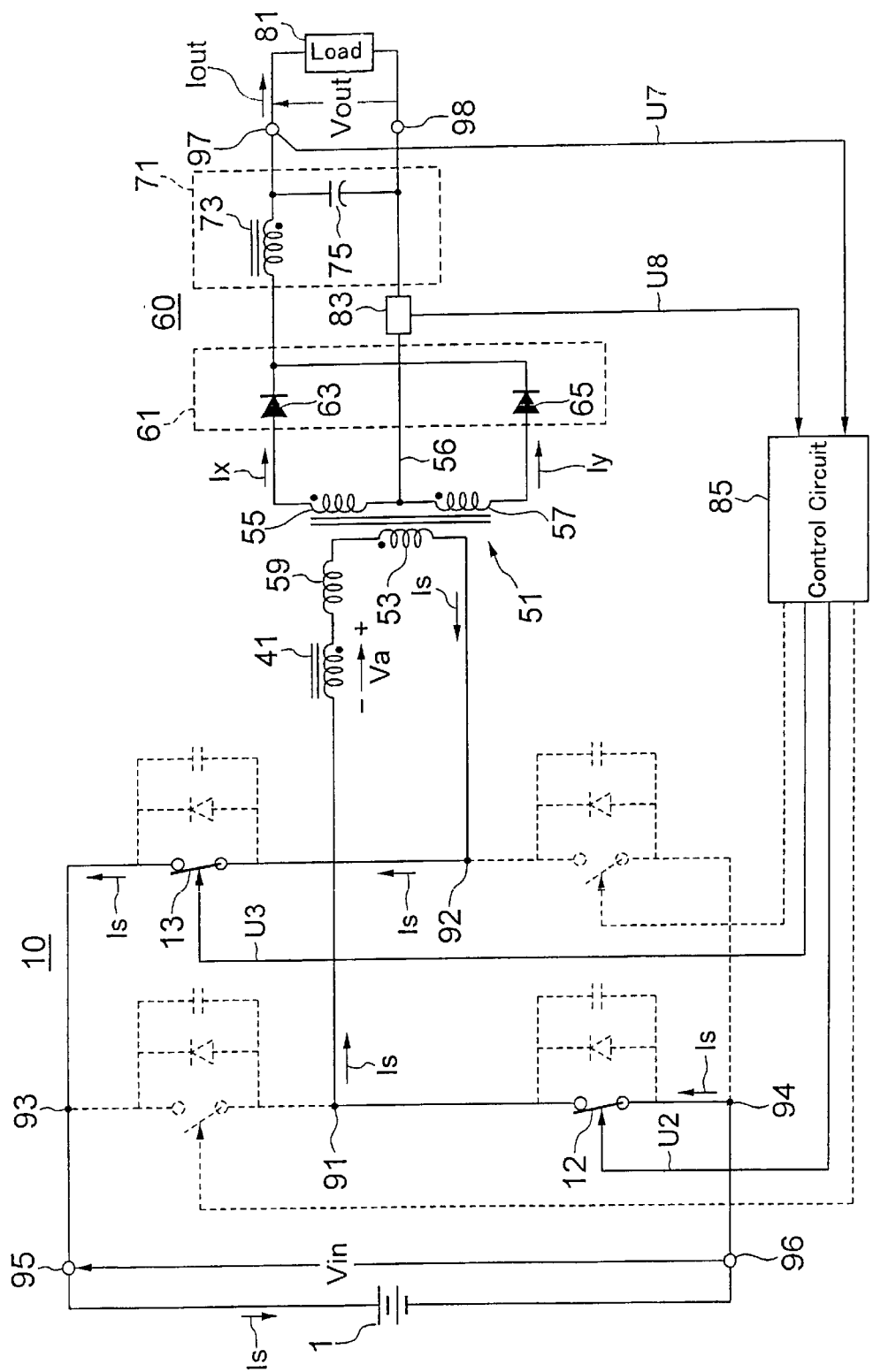
FIG. 11 illustrates an extracted part of the circuit of the switching power supply unit shown in FIG. 1, wherein the extracted part is operated in the fifth stage.
Figure 12:
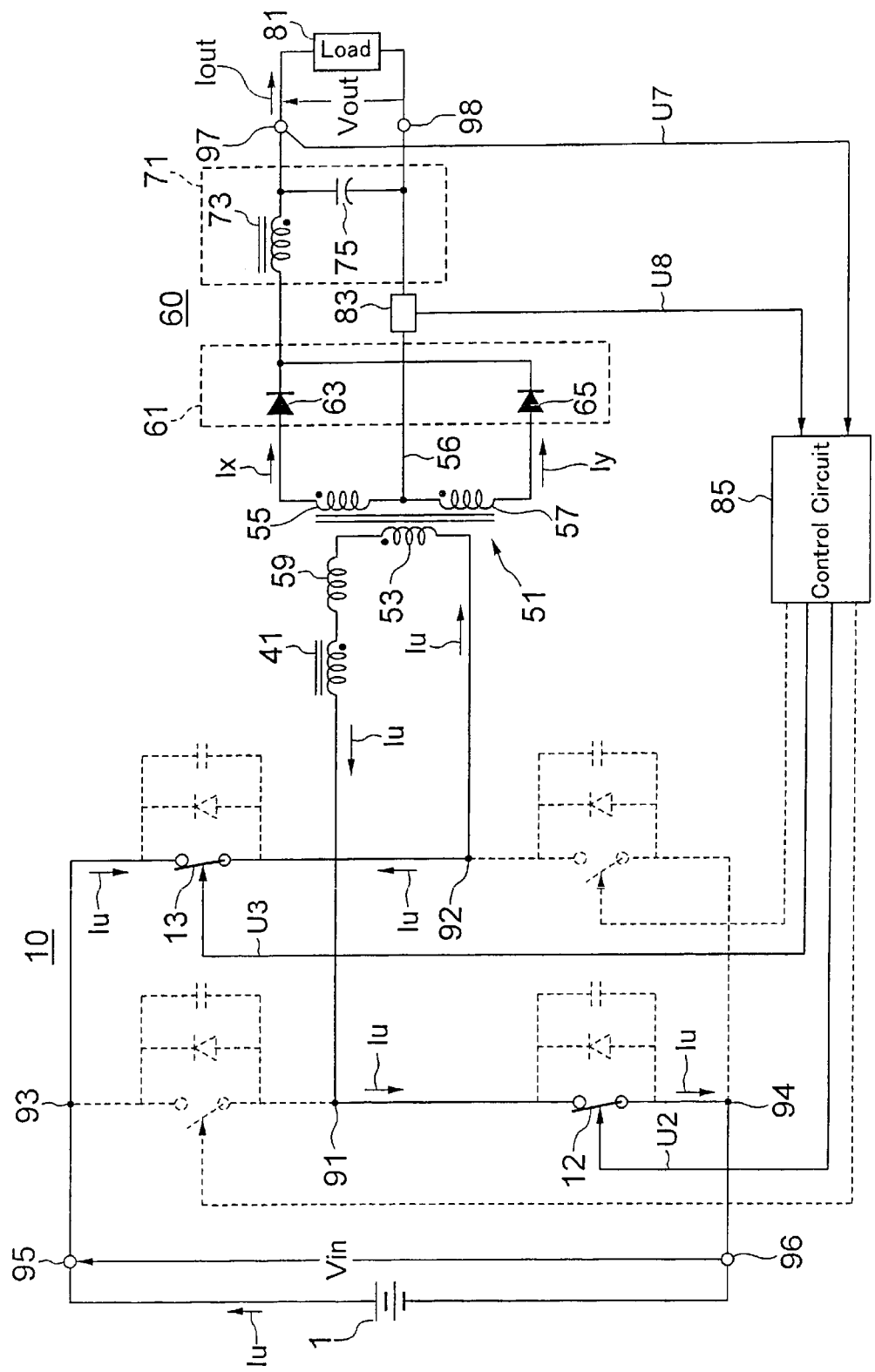
FIG. 12 illustrates an extracted part of the circuit of the switching power supply unit shown in FIG. 1, wherein the extracted part is operated in the fifth stage.
Figure 13:
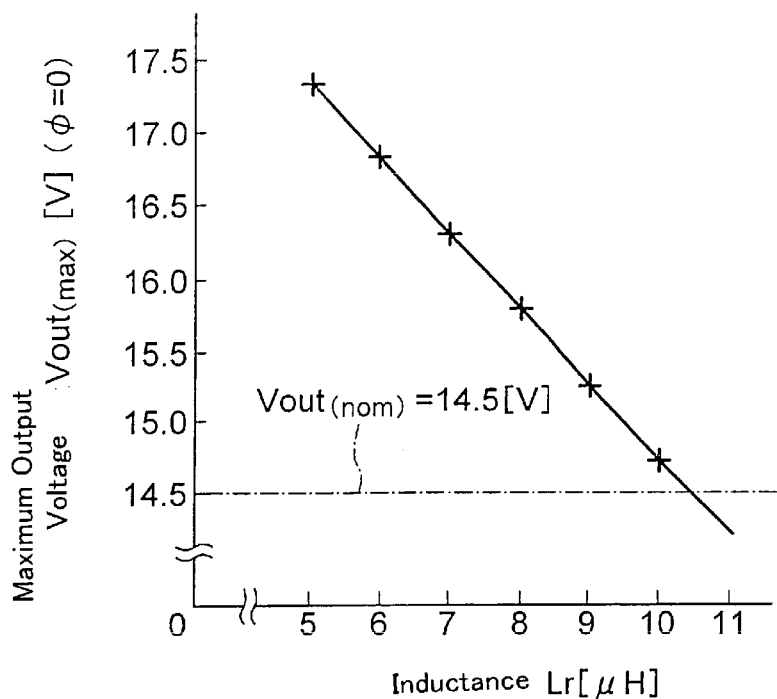
FIG. 13 illustrates the relationship between the inductance value Lr and the output voltage Vout in the switching power supply unit shown in FIG. 1.

The fifth stage corresponds to the period T5 in FIG. 4. Each of FIGS. 10 to 12 illustrates an extracted part of the circuit operated in the fifth stage. In the fifth stage, as a consequence that the diode 23 of the switching element 13 is conducted, the energy accumulated in the inductor 41 is regeneratively returned to the input voltage source 1 through the second switching element 12 and the diode 23 of the third switching element 13 (see FIG. 10).

Ii the course of the fifth stage, while the third switching element 13 is turned on (see FIG. 11), the fundamental operational state is not changed. When the current Is passing through the inductor 41 becomes zero, a charging current Iu passes through the inductor 41 (see FIG. 12). The charging current Iu continuously passes through until a current Iy passing through the output rectifier diode 65 becomes equal to the DC output current Iout. Thus, the current passing through in this fifth stage is linearly changed. Further, before the current Is passing through the inductor 41 becomes zero, the third switching element 13 or the fourth switching element 14 is turned off. This prevents any undesirable resonance otherwise caused again during the dead time Td.

In order to determine the resonance inductance value Lr for outputting the rated output voltage Vout (nom) regardless of any fluctuation in the input voltage and load, the following conditions A, B and C are provided. The resonance inductance value Lr is the combined value (L1+L2) of the inductance value L2 of the inductor 41 and the leakage inductance value L1 of the transformer 51.

<Condition A>

In the switching phase-difference f of zero, the minimum input voltage Vin (min) and the maximum output current Iout (max), the output voltage Vout larger than or equal to the rated output voltage Vout (nom) should be output.

A formula representing each elapsed time T1–T5 of the stages is first derived. Each period T1–T5 of the stages can be represented as follows by substituting a boundary condition of each of the stages from each circuit formula of the stages and arranging. Where the exciting inductance of the transformer 51 and the inductance of the choke coil 73 are large enough to make the inductance Lr of the resonance circuit negligible, and each turn-on resistance of the first, second, third and fourth switching elements 11, 12, 13, 14, and each forward voltage drop of the diodes 21, 22, 23, 24 and the output rectifier diodes 63, 65 are vanishingly small. Further, all of the capacitors 31, 32, 33, 34 connected to the first, second, third and fourth switching elements are equal to each other, and their capacitances are not changed by the applied voltage.

Furthermore, Vout is an output voltage (V), n is a turn ratio of the transformer 51 (the number of turns of the secondary winding/the number of turns of the primary winding), Vin is an input voltage (V), Tsw is each driving period of the first, second, third and fourth switching elements 11, 12, 13, 14, C is each capacitance value (F) of the capacitors 31, 32, 33, 34 connected to the first, second, third and fourth switching elements 12, 13, 14, Iout is an output current (A), w is an angular frequency (rad/sec) of the resonance circuit comprised of the resonance inductance Lr and the capacitance value C, and Z is a characteristic impedance (Ω).

$$T1 = \frac{V_{out} \cdot T_{sw} - n \cdot V_{in} \cdot T2}{2 \cdot n \cdot V_{in}} \quad (1)$$

$$T2 = \frac{2 \cdot C \cdot V_{in}}{n \cdot I_{out}} \quad (2)$$

$$T3 = \frac{T_{sw}}{2} - (T1 + T2 + T4 + T5) \quad (3)$$

$$T4 = \left\{\frac{1}{\omega}\right\} \cdot \sin^{-1}\left\{\frac{V_{in}}{n \cdot I_{out} \cdot Z}\right\} \quad (4)$$

$$T5 = \frac{n \cdot I_{out} \cdot L_r \cdot \{1 + \cos(\omega \cdot T4)\}}{V_{in}} \quad (5)$$

In above formulas, given that the angular frequency of the resonance circuit is w (rad/s), and the characteristic impedance is Z (Ω), the following formula is derived.

$$\omega = \sqrt{\frac{1}{2 \cdot L_r \cdot C}} \quad (a)$$

$$Z = \sqrt{\frac{L_r}{2 \cdot C}} \quad (b)$$

A phase-difference φ can be represented as the follow using the formula (3).

φ=T3+T2

=(T$_{SW}$/2)−(T1+T4+T5)

The formula (3) can be represented as follows by substituting φ=0, the formula (1) and the formula (2) thereinto.

$$V_{out} = \frac{\left\{\frac{T_{sw}}{2} - T4 - T5\right\} \cdot 2 \cdot n \cdot V_{in}}{T_{sw}} + \frac{2 \cdot C \cdot V_{in}^2}{I_{out} T_{sw}}$$

Further, it is required to provide the output voltage Vout larger than the rated output voltage value Vout (nom) when substituting the minimum input voltage value Vin (min) for the input voltage Vin, the maximum output current value Iout (max) for the output current Iout,. Thus, the following formula can be obtained.

$$V_{out(nom)} \leq \frac{\left\{\frac{T_{sw}}{2} - T4 - T5\right\} \cdot 2 \cdot n \cdot V_{in(min)}}{T_{sw}} + \frac{2 \cdot C \cdot V_{in(min)}^2}{I_{out(max)} T_{sw}} \quad (6)$$

If the above formula (6) is satisfied, the condition A can also be satisfied. Furthermore, the maximum value of the inductance Lr can be derived from the formula (6). Each period T4, T5 of the fourth and fifth stages can be obtained from the following formula.

$$T4 = \left\{\frac{1}{\omega}\right\} \cdot \sin^{-1}\left\{\frac{V_{in(min)}}{n \cdot I_{out(max)} \cdot Z}\right\}$$

$$T5 = \frac{n \cdot I_{out(max)} \cdot L_r \cdot \{1 + \cos(\omega \cdot T4)\}}{V_{in(min)}}$$

In order to achieve the ZVS, the following two conditions are provided for designing the inductance value Lr (=L1+ L2) of the resonance circuit and the dead time Td between the first and second switching elements 11, 12.

<Condition B>

Even in the maximum input voltage Vin (max) and the minimum output current Iout (min), the applied voltage of the first, second, third and fourth switching elements 11, 12, 13, 14 should be clamped to the input voltage Vin (max).

<Condition C>

After clamping the applied voltage of the first, second, third and fourth switching elements 11, 12, 13, 14 to the input voltage Vin, any resonance should not be caused again during the dead time Td.

In order to satisfy the condition B, it is required to satisfy both the following voltage condition and time condition. The voltage condition is that the peak value of the applied voltage of the switching element 14 in the fourth stage becomes larger than the input voltage Vin. The time condition is that the time necessary for clamping the applied voltage of the switching element 14 to the input voltage Vin becomes shorter than the dead time Td. The above voltage and time conditions can be applied to the switching element 13 as well.

In order to provide the peak value of the applied voltage of the switching element 11 or 12 larger than the input voltage Vin during the dead time Td between the first and second switching elements 11, 12 in the second stage, it is required to satisfy each of the conditions in the fourth stage. This is because the peak value of voltage in the second stage is larger than the peak value of voltage in the fourth stage, and the time necessary for clamping in the second stage inevitably becomes shorter than that in the fourth stage by the formulas (2) and (4).

The voltage conditions will be first obtained.

From the formula representing the applied voltage V4 of the fourth switching element 14 in the fourth stage, the peak value V4 (peak) applied to the fourth switching element 14 is determined as follows.

$$V4_{(peak)} = n \cdot I_{out} \cdot Z \quad (7)$$

The condition for clamping the voltage of the fourth switching element 14 to the input voltage Vin is as follows.

$$V4_{(peak)} \geq V_{in} \quad (8)$$

By substituting the formula (7) into the formula (8), the maximum input voltage Vin (max) for the input voltage Vin, the minimum output current Iout (min) for the output current Iout, and the aforementioned formula (b) for the characteristic impedance Z, and then modifying them, a conditional formula for providing the peak value of the applied voltage of the switching element 14 in the fourth stage larger than the input voltage can be obtained.

$$Lr \geq \frac{2 \cdot C \cdot V_{in(max)}^2}{(n \cdot I_{out(min)})^2} \quad (9)$$

In a switching power supply unit having an arranged input voltage range, the voltage condition in the entire input voltage range of the minimum input voltage to the maximum input voltage can be obtained by substituting the maximum input voltage into the formula (9). The formula (9) is provided for deriving the minimum value of the inductance value Lr.

Then, the time condition will be determined.

The following formula can be derived from conditions that the voltage of the switching element 14 is clamped to the input voltage Vin during the dead time Td, in the maximum input voltage Vin (max) and the minimum output current Iout (min).

$$\left\{\frac{1}{\omega}\right\} \cdot \sin^{-1}\left\{\frac{V_{in(max)}}{n \cdot I_{out(min)} \cdot Z}\right\} < T_d \quad (10)$$

By substitution the inductance value Lr of any resonance circuit obtained from the formula (9) into the formula (10), the minimum value of the dead time Td in any inductance value Lr can be determined. If both the formulas (9) and (10) are simultaneously satisfied, the condition B can also be satisfied. Further, the range of the inductance value Lr of the resonance circuit can be specified by the formulas (6) and (9).

In order to satisfy the condition C, it is required to provide the sum Tz of the period T4 in fourth-stage and the period necessary for obtaining the current Is of zero in the fifth stage (see FIG. 2(f)) larger than the dead time Td. Thus, the following formula is derived by using the formulas (4) and (5).

$$\left\{\frac{1}{\omega}\right\} \cdot \sin^{-1}\left\{\frac{V_{in(max)}}{n \cdot I_{out(min)} \cdot Z}\right\} + n \cdot I_{out(min)} \cdot \cos(\omega \cdot T4) \cdot \frac{L_r}{V_{in(max)}} > T_d \quad (11)$$

If the condition of the formula (11) is satisfied, the condition C can also be satisfied. Moreover, the range of the dead time Td for any inductance value Lr can be specified by the formulas (10) and (11).

As an operative example, in a converter having a rated output voltage of 14.5 V, a rated output current of 80 A, a turn ratio n of ⅛, a capacity of the capacitors 31, 32, 33, 34 provided in the switching elements 11, 12, 13, 14 of 1000 pF and a driving frequency for the switching elements 11, 12, 13, 14 of 100 kHz, the inductance value Lr and dead time Td for allowing the ZVS in the input-voltage range of 160 V to 408 V and the output-current range of 65 A to 85 A will be designed.

By substituting the above circuit conditions into the formula (6), the relationship between the inductance value Lr and the output voltage Vout can be illustrated as in FIG. 11. In this case, it is identified that the inductance value Lr for satisfying the condition A is smaller than or equal to about 10 µH.

Similarly, the voltage condition for the condition B is determined by substituting the maximum input voltage=408 V into the formula (9). Form this result, it is identified that the inductance value Lr is greater than or equal to about 5.05 µH.

Similarly, the time condition is determined from the formula (10). Form this result, it is identified that the dead time Td is greater than or equal to about 154.2 nsec when the inductance value Lr is 5.05 µH, and the dead time Td is greater than or equal to about 111.7 nsec when the inductance value Lr is 10 µH.

Similarly, from the formula (11), it is identified that the dead time Td for satisfying the condition D is smaller than or equal to about 157.9 nsec when the inductance value Lr is 5.05 µH, and the dead time Td is about 251.9 nsec when the inductance value Lr is 10 µH.

Figure 14:
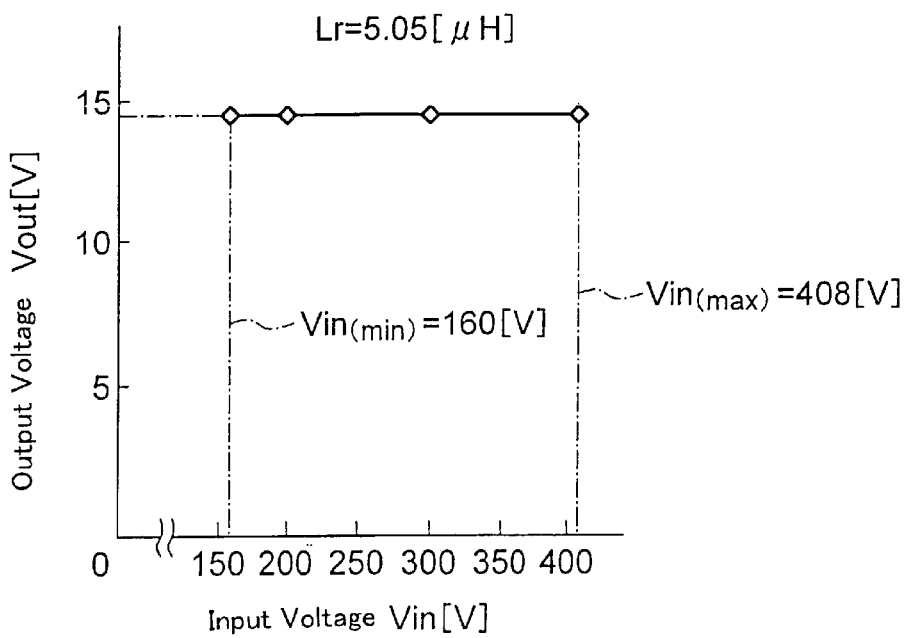
FIG. 14 illustrates an input voltage-to-output voltage characteristic of a switching power supply unit according to the present invention, where the inductance value Lr is 5.05 μH.
Figure 15:
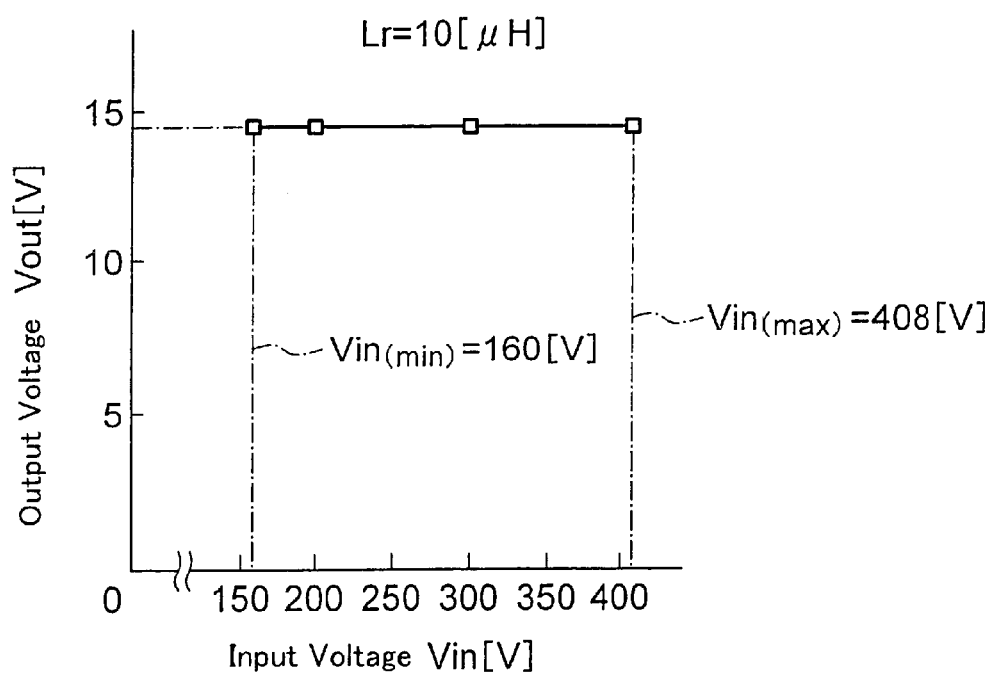
FIG. 15 illustrates an input voltage-to-output voltage characteristic of a switching power supply unit according to the present invention, where the inductance value Lr is 10 μH.

As above, it is understood that the inductance value Lr for satisfying all of the conditions A to C is in the range of 5.05 µH to 10 µH. That is, 5.05 µH ≦ Lr ≦ 10 µH Further, when the inductance value Lr is 5.05 µH, the dead time Td is between in the range of 154.2 nsec to 157.9 nsec. That is, 154.2 nsec ≦ Td ≦ 157.9 nsec It is identified that the dead time Td is in the range of 111.7 nsec to 251.9 nsec, when the inductance value Lr is 10 mH. That is, 111.7 nsec ≦ Td ≦ 251.9 nsec Each of FIGS. 14 and 15 illustrates an input voltage-to-output voltage characteristic of a switching power supply unit designed according to the above conditions. As shown in FIG. 14, when the inductance value Lr is selected as 5.05 mH, a stable rated output voltage of 14.5 V is provided in the range of the minimum input voltage 160 V to the maximum input voltage 408 V. As shown in FIG. 15, when the inductance value Lr is selected as 10 mH, a stable rated output voltage of 14.5 V is also provided in the range of the minimum input voltage 160 V and the maximum input voltage 408 V.

Figure 16:
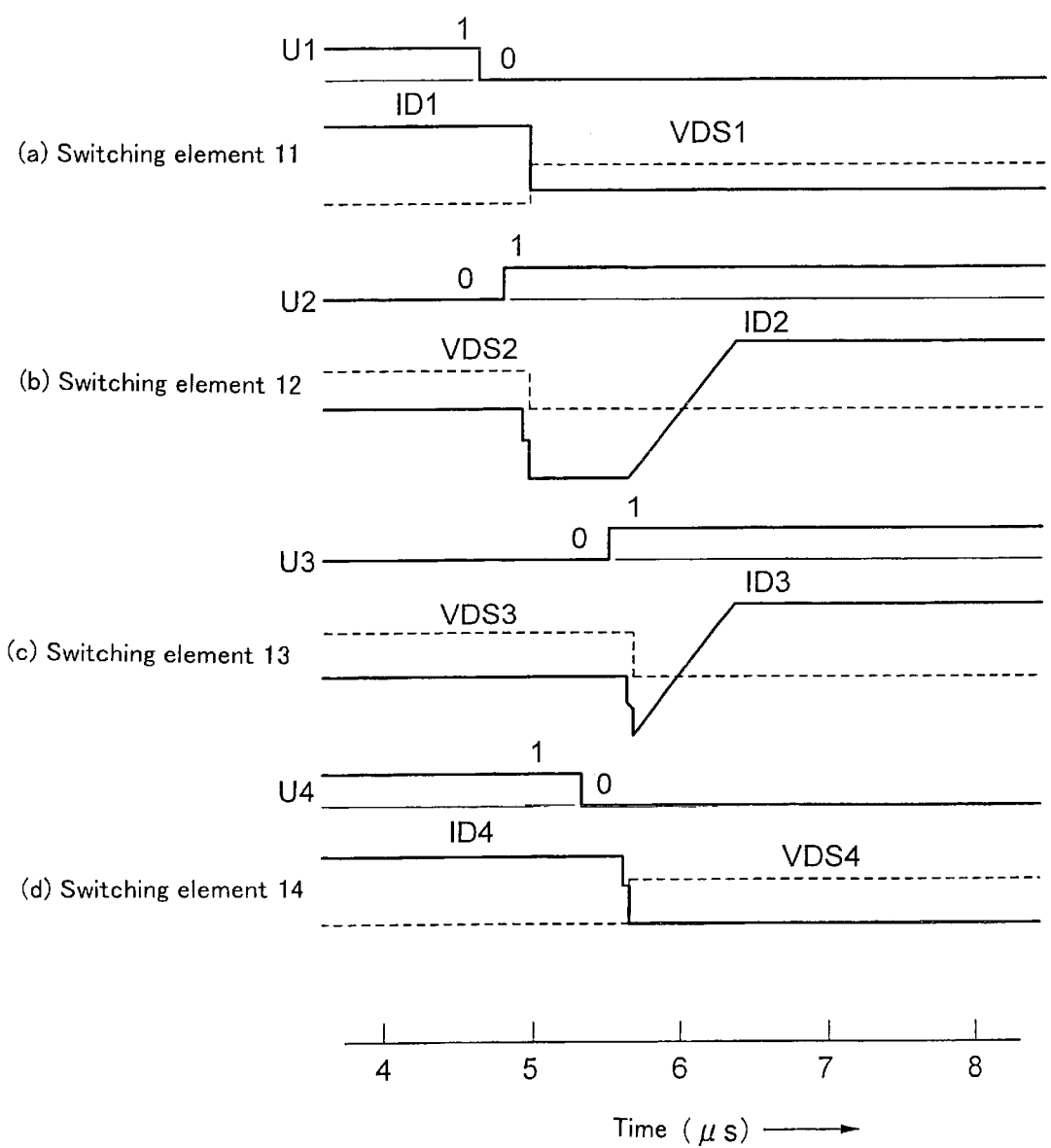
FIG. 16 is illustrates a simulation result in a switching power supply unit according to the present invention, where the inductance value Lr is 5.05 μH, the dead time Td being 155 nsec, the input voltage Vin being 160 V, and the output current Iout being 85 A.
Figure 17:
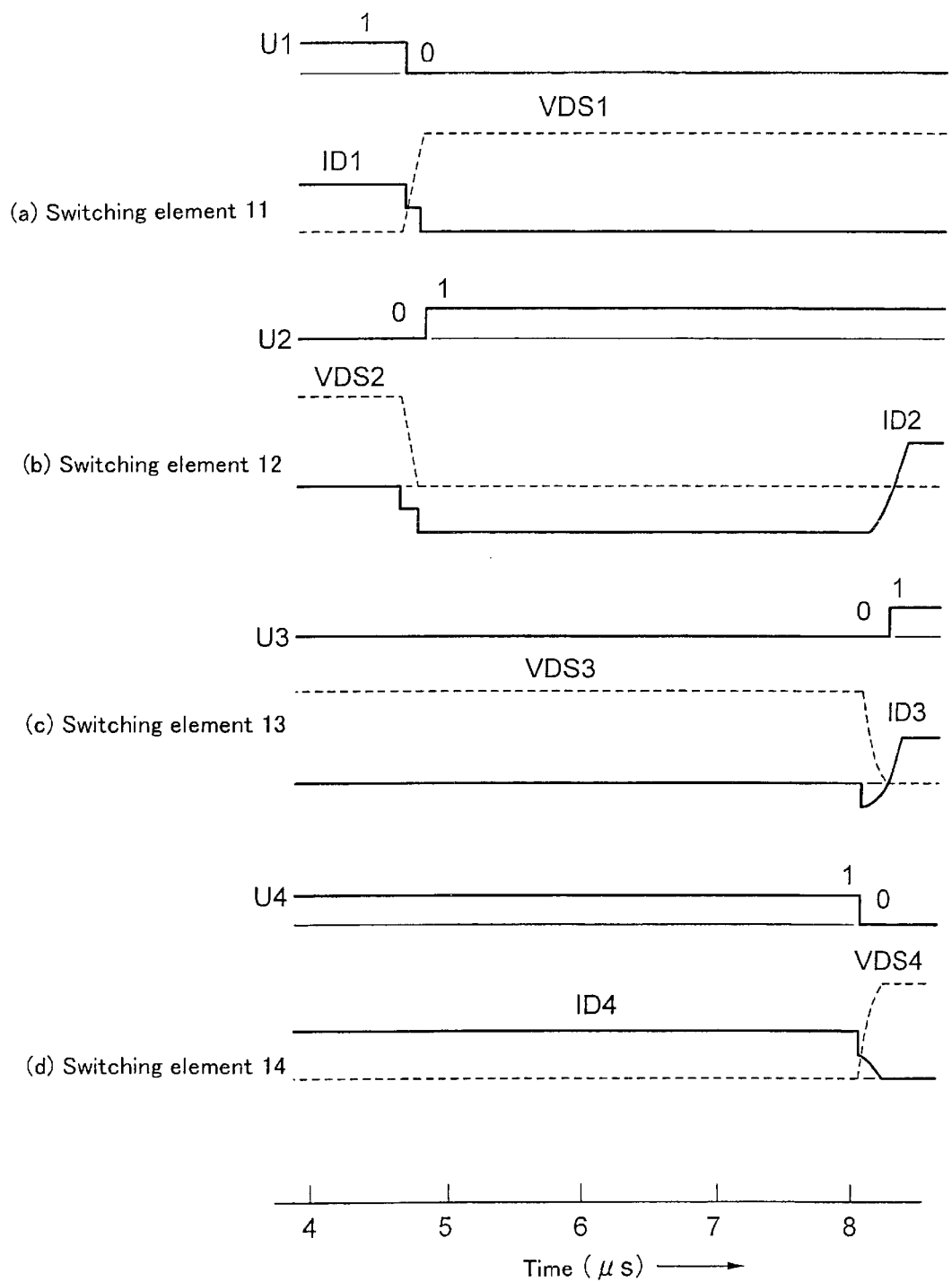
FIG. 17 illustrates a simulation result in a switching power supply unit according to the present invention, where the inductance value Lr is 5.05 μH, the dead time Td being 155 nsec, the input voltage Vin being 408 V, and the output current Iout being 65 A.

Each of FIGS. 16 and 17 illustrate a simulation result in the inductance value Lr of 5.05 mH and the dead time Td of 155 nsec. FIG. 16 illustrates a simulation result in the input voltage Vin of 160 V and the output current Iout of 85 A. FIG. 17 illustrates a simulation result in the input voltage Vin of 408 V and the output current Iout of 65 A. In FIGS. 16 and 17, the reference codes U1–U4 indicate signals supplied to the gates of the switching elements 11, 12, 13, 14. The logical value "1" corresponds to the signals for turning on the switching elements 11, 12, 13, 14, and the logical value "0" corresponds to the signals for turning off the switching elements 11, 12, 13, 14. For the switching element 11, the reference code ID1 indicates a current passing through the parallel connection circuit comprised of the switching element 11, the diode 21 and the capacitor 31. The reference code VDS1 indicates a voltage applied between the drain and source of the switching element 11. The reference codes ID2–ID4 and VDS2–VDS4 for other switching elements 12, 13, 14 are the same as those of the switching element 11.

As shown in FIGS. 16 and 17, in both cases that the input voltage Vin is 160 V and the output current Iout is 85 A, and the input voltage Vin is 408 V and the output current Iout is 65 A, the ZVS is achieved without any problem and the rated output voltage can be output. In FIGS. 16 and 17, it is apparent that the ZVS is achieved because of the fact that the current ID3 increases from negative to positive in the state when the voltage VDS3 applied between the drain and source in the switching element 13 becomes zero.

Figure 18:
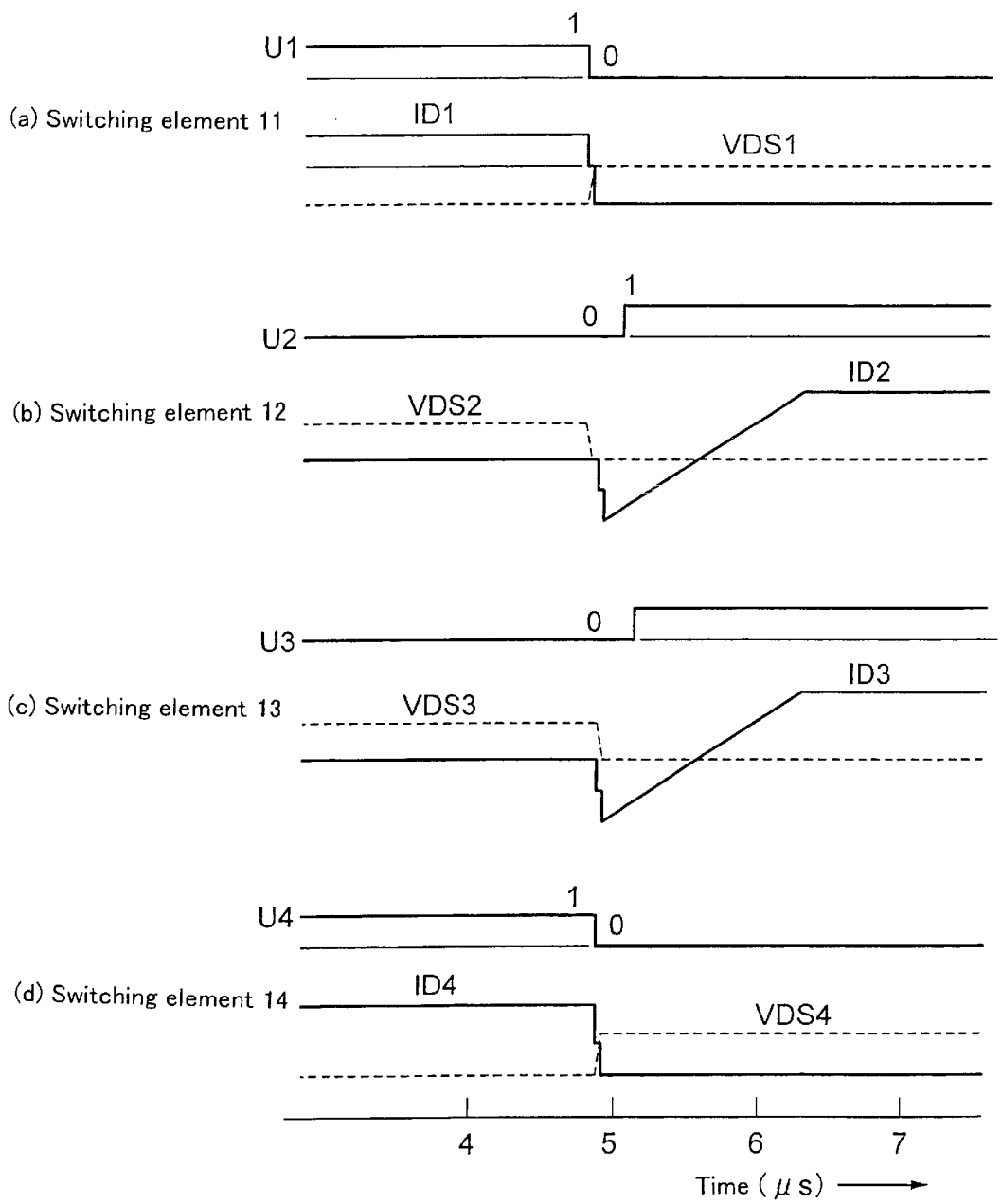
FIG. 18 illustrates a simulation result in a switching power supply unit according to the present invention, where the inductance value Lr is 10 μH, the dead time Td being 250 nsec, the input voltage Vin being 160 V, and the output current Iout being 85 A.
Figure 19:
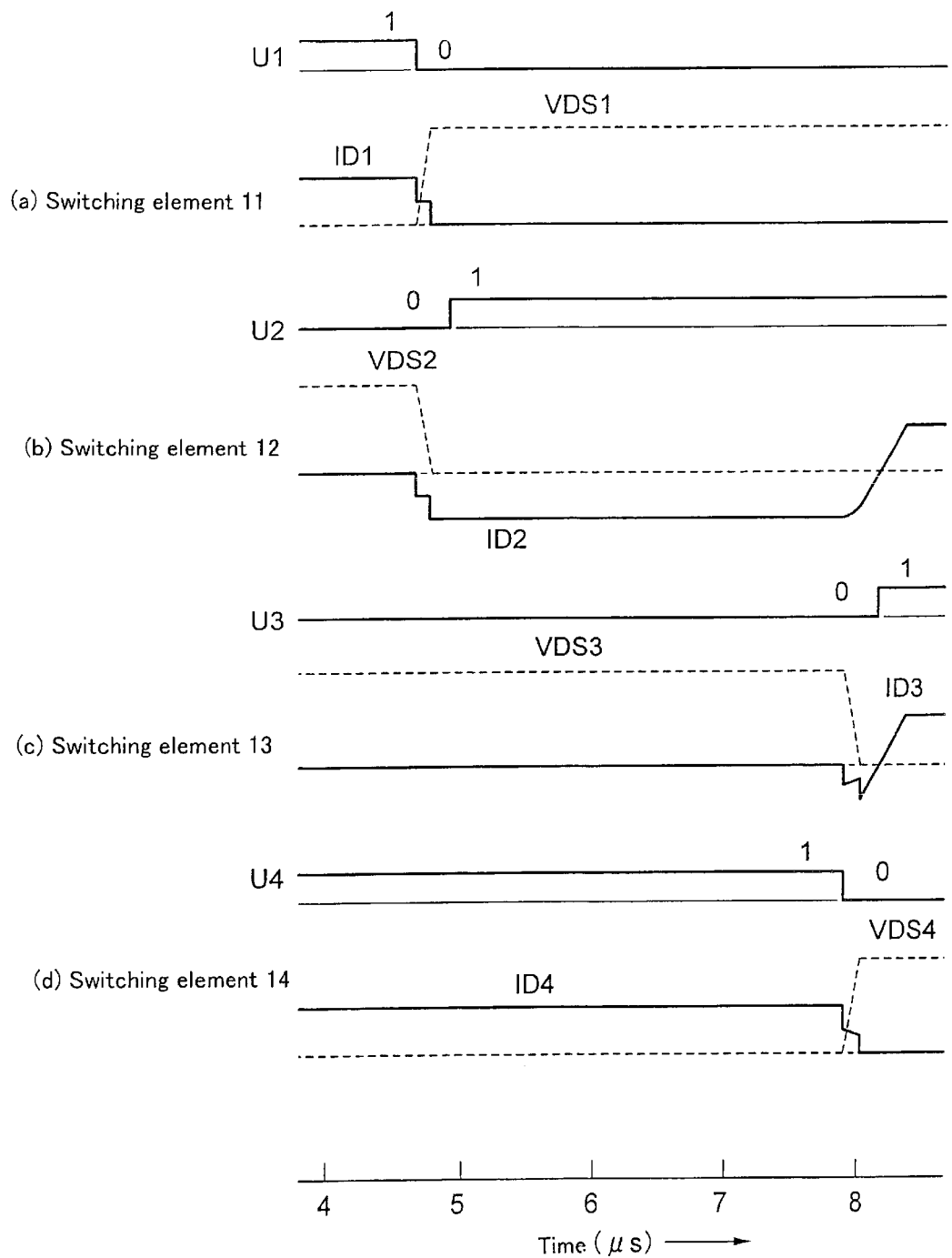
FIG. 19 illustrates a simulation result in a switching power supply unit according to the present invention, where the inductance value Lr is 10 μH, the dead time Td being 250 nsec, the input voltage Vin being 408 V, and the output current Iout being 65 A.

Each of FIGS. 18 and 19 illustrates a simulation result in the inductance value Lr of 10 mH and the dead time Td of 250 nsec. FIG. 18 illustrates a simulation result in the input voltage Vin of 160 V and the output current Iout of 85 A. FIG. 19 illustrates a simulation result in the input voltage Vin of 408 V and the output current Iout of 65 A. In FIGS. 18 and 19, the reference codes are the same as those of FIGS. 16 and 17. The reference codes U1–U4 indicate signals provided to the gates of the switching elements 11, 12, 13, 14. The logical value "1" corresponds to the signals for turning on the switching elements 11, 12, 13, 14, and the logical value "0" Further, for the switching element 11, the reference code ID1 indicates a current passing through the parallel connection circuit comprised of the switching element 11, the diode 21, and the capacitor 31. The reference code VDS1 indicates a voltage applied between the drain and source of the switching element 11. The reference codes ID2–ID4 and VDS2–VDS4 of other switching elements 12–14 are also the same as those of the switching element 11.

As shown in FIGS. 18 and 19, in both cases that the input voltage Vin is 160 V and the output current Iout is 85 A, and the input voltage Vin is 408 V and the output current is 65 A, the ZVS is achieved without any problem and the rated output voltage can be output.

The conditions of the resonance inductance value Lr (H) for operating the first, second, third and fourth switching elements 11, 12, 13, 14 with the ZVS at a given input voltage Vin (V) and rated output current Iout (A), and the conditions for preventing any undesirable resonance from arising again during the dead time Td (s) are shown in the formulas (9) and (11).

An operative example will be described below. The minimum value of the inductance necessary for achieving the ZVS in the input voltage Vin=200 V and the rated output current Iout=80 A can be determined as Lr=0.8 mH from the formula (9).

Further, in consideration of preventing any undesirable resonance from arising again during the dead time Td, Lr=4.6 mH is derived from the formula (11).

Figure 20:
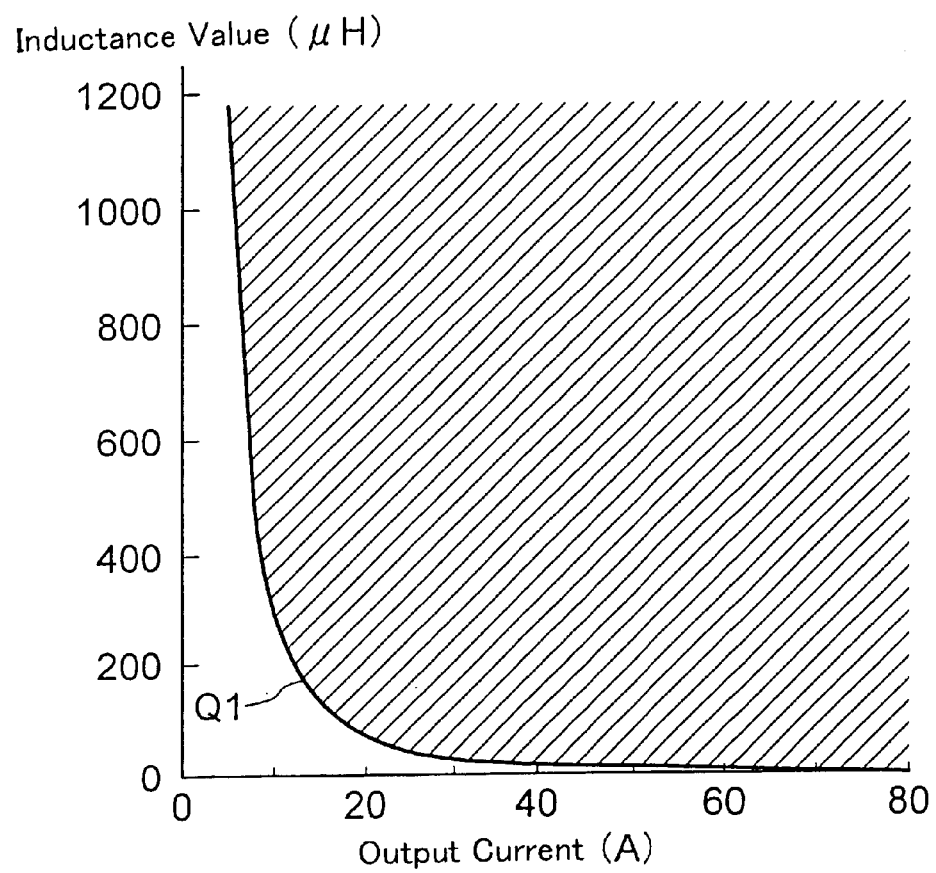
FIG. 20 illustrates an output current change-to-inductance change characteristic.

Based on this inductance value, the resonance inductance value Lr required in case that the output current (load current) goes down is calculated by using the following formula (12). A relationship as shown in FIG. 20 is derived.

$$L_r(I) = L_r(I_O) \cdot \{I_O/I\}^2 \quad (12)$$

Where,

Lr (I): Inductance value (H) of the resonance circuit at any given output current Lr (Io): Inductance value (H) of the resonance circuit at the rated output current I: Any given output current (A)

Io: The rated output current (A)

The inductor 41 is constructed to provide the inductance change characteristic as shown in FIG. 20. Specifically, when the inductance change characteristic is intended to obtain by means of the configuration of the core as shown in FIG. 2, the configuration of the inclined portion 201 is designed to provide the inductance change characteristic shown in FIG. 20. Moreover, when the external signal control technique of FIG. 3 is employed, the inductance value of the variable inductor 41 is controlled by the control circuit 85 to provide the change characteristics shown in FIG. 20. In the present invention, the range covered by the resonance inductance value Lr is the shaded region above the inductance change characteristic Q1.

Figure 21:
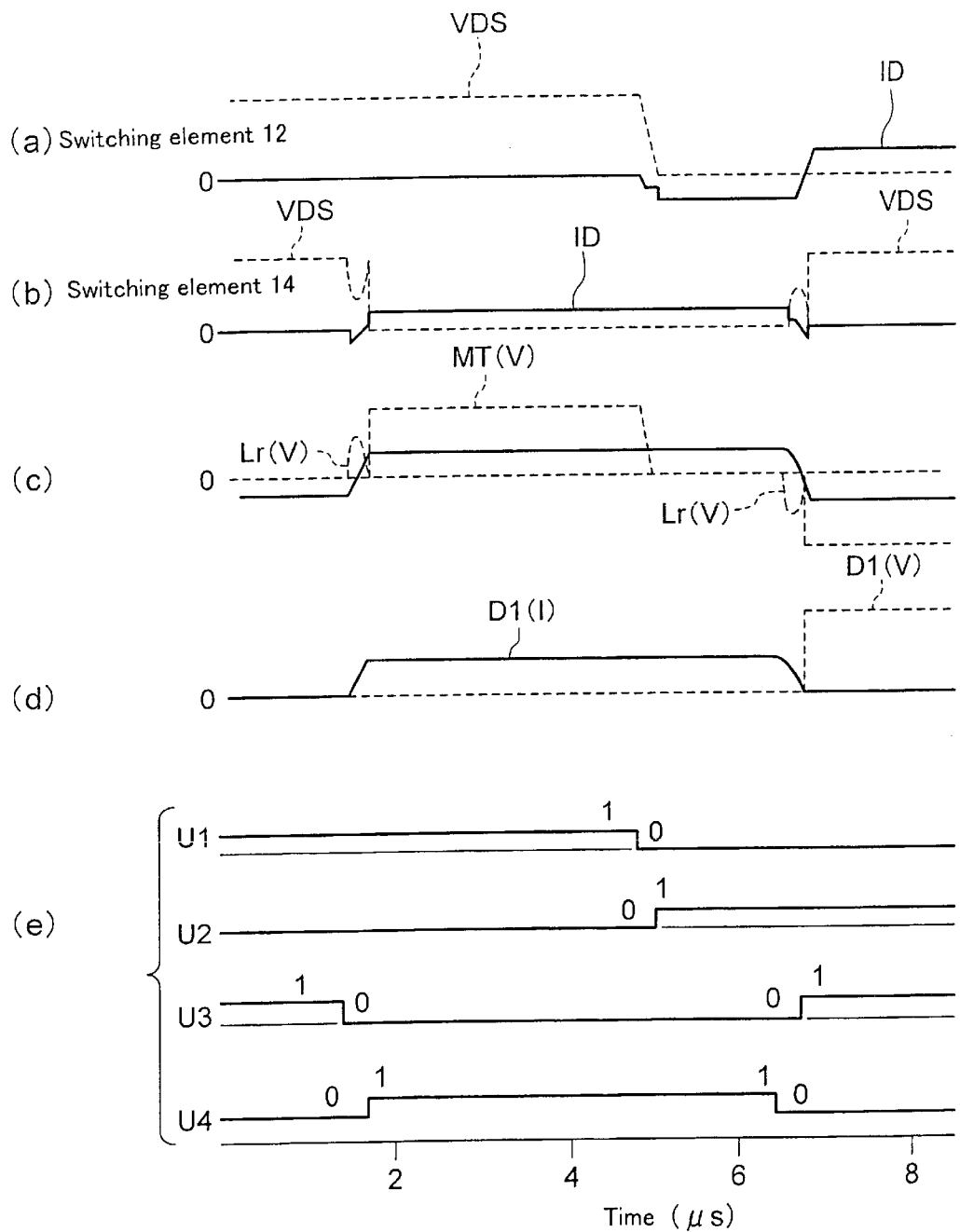
FIG. 21 illustrates a simulation result in the switching power supply unit shown in FIG. 1, or illustrates a switching waveform of a switching element, where the inductance value of the inductor is fixed, the input voltage Vin being 200 V, and the output current Iout being 20 A.
Figure 22:
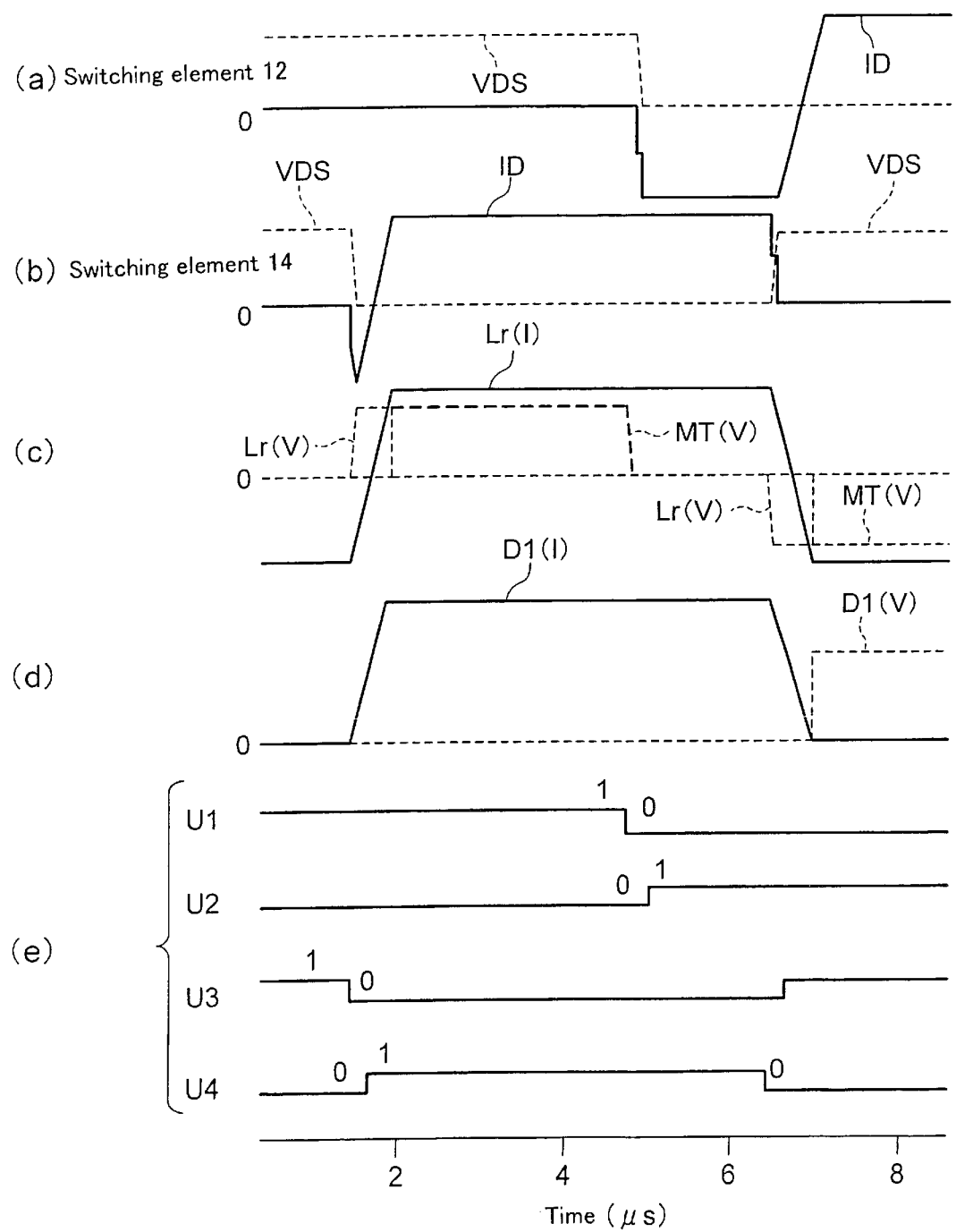
FIG. 22 illustrates a simulation result in the switching power supply unit shown in FIG. 1, or illustrates a switching waveform of a switching element, where the inductance value of the inductor is fixed, the input voltage Vin being 200 V, and the output current being 80 A.
Figure 23:
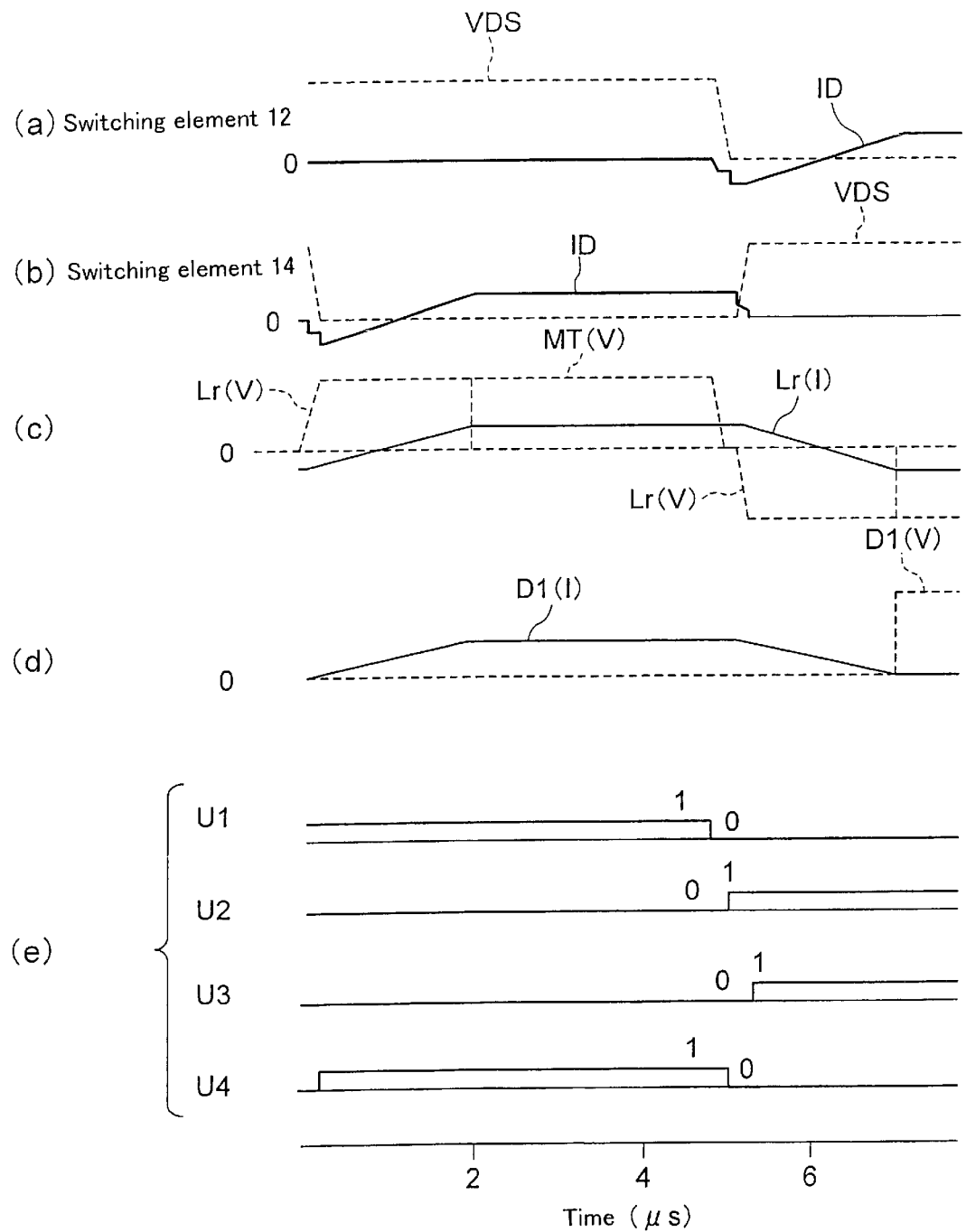
FIG. 23 illustrates a simulation result of the switching power supply unit as shown in FIG. 1 according to the present invention, or illustrates each switching waveform of second and fourth switching elements where the inductance value of the inductor is fixed, the input voltage Vin being 200 V, and the output current Iout being 20 A.

Each of FIGS. 21 to 23 illustrates a simulation result of the switching power supply unit. FIG. 21 illustrates a switching simulation result when the inductance value of the inductor 41 is fixed at 4.6 μH, the input voltage Vin being 200 V, and the output current Iout being 20 A. FIG. 21(a) shows a switching waveform of the second switching element 12, and FIG. 21(b) shows a switching waveform of the fourth switching element 14. FIG. 21(c) shows each waveform of the current Ir(I) passing through the resonance circuit, the voltage Lr(V) applied to the inductor 41 comprising the resonance circuit, and the voltage MT(V) applied to the first winding 53 of the transformer 51. FIG. 21(d) shows each waveform of the current DI(I) passing through the diode 63, and the voltage D1(V) applied to the diode 63. FIG. 21(e) shows each waveform of the driving signals U1–U4 supplied to the first, second, third and fourth switching elements 11, 12, 13, 14.

FIG. 22 illustrating a switching simulation result when the inductance value of the inductor 41 is fixed at 4.6 mH determined from the formulas (1) and (2), the input voltage Vin being 200 V, and the output current Iout being 80 A. The waveforms illustrated in FIGS. 22(a) to (e) are the same as those of FIGS. 21(a) to (e).

FIG. 23 illustrates a simulation result of the switching power supply unit according to the present invention shown in FIG. 1 or illustrates each switching waveform of the second and fourth switching elements 12, 14 when the input voltage Vin is 200 V and the output current Iout is 20 A. The inductance value of the inductor 41 is selected as 73.6 μH which is the resonance inductor calculated by using the formula (3) for the output current of 20 A. The waveforms of FIGS. 23(a) to (e) are the same as those of FIGS. 14(a) to (e).

In FIG. 21, seeing from the waveform of the voltage VDS applied between the drain and source and the waveform of the drain current Id of the second and fourth switching elements 12, 14, the ZVS is not achieved when the drain current ID is 20 A.

In FIG. 22, seeing from the waveform of the voltage VDS applied between the drain and source and the waveform of the drain current ID of the second and fourth switching elements 12, 14, the ZVS is achieved when the drain current ID is 80 A.

As shown in FIG. 23, when the inductance value of the inductor 41 is set at 73.6 μH corresponding to the value for the output current of 20 A, the ZVS is achieved.

Figure 24:
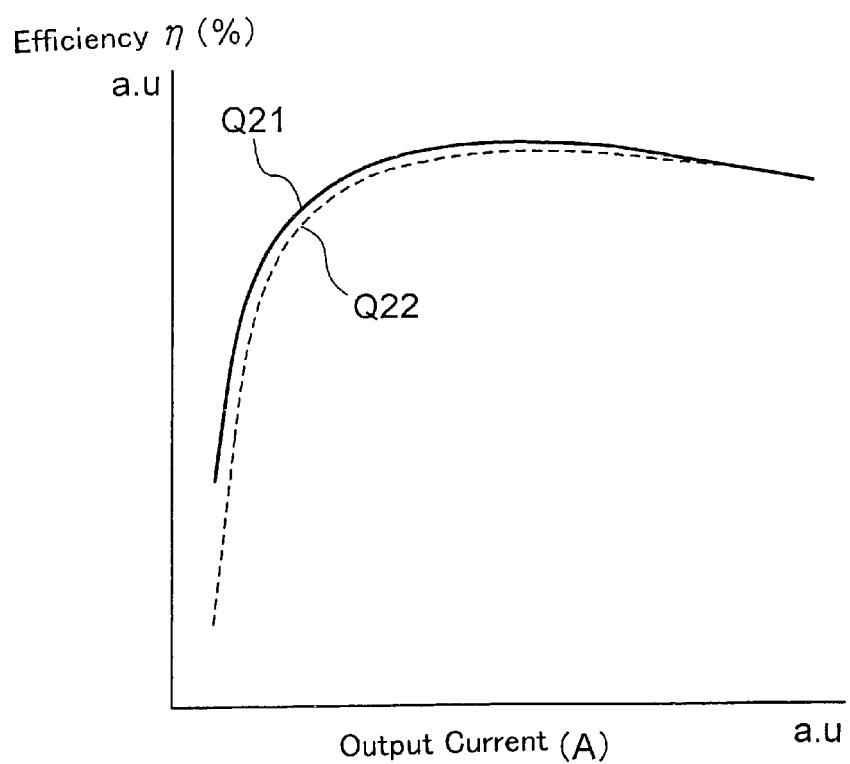
FIG. 24 illustrates the relationship between the output current and the efficiency.

FIG. 24 illustrates the relationship between the output current and the efficiency. The curve Q21 represents a characteristic of the switching power supply unit when the inductance value of the inductor 41 is changed in response to the output current. The curve Q22 represents a characteristic of the switching power supply unit when the inductance value of the inductor 41 is fixed. As illustrated, the efficiency can be improved by changing the inductance value of the inductor 41 according to the magnitude of the load current.

As the above mentioned, the present invention can provide the following advantages.

(a) A switching power supply unit capable of adjusting the inductance value of the resonance circuit can be provided.

(b) A switching power supply unit capable of outputting the rated output voltage regardless of any fluctuation in the input voltage and load can be provided.

(c) A switching power supply unit capable of serving as a foundation for achieving the ZVS regardless of any fluctuation in the input voltage and load.

What is claimed is:

1. A switching power supply unit comprising:

a switching circuit including first, second, third and fourth switching elements each having a pair of electrodes, wherein respective ones of the main electrodes of said first and second switching elements are connected to each other to form a first connection point, respective ones of the main electrodes of said third and fourth switching elements being connected to each other to form a second connection point, the other main electrode of said first switching element and the other main electrode of said third switching element being connected to each other to form a third connection point, and the other main electrode of said second switching element and the other main electrode of said fourth switching element being connected to each other to form a fourth connection point;

a pair of DC voltage input ends connected to said third and fourth connection points so as to allow a DC voltage to be applied with a unidirectional polarity between said pair of main electrodes in each of said switching elements;

a diode disposed between said main electrodes in parallel with each of said first, second, third and fourth switching elements to have a polarity opposite to said polarity;

a capacitor disposed between said main electrodes in parallel with each of the first, second, third and fourth switching elements;

a transformer including first and second windings, wherein said first winding is connected between said first and second connection points to generate a switching output at said second winding in response to a switching operation of said switching element in said switching circuit;

an output circuit for rectifying and smoothing the switching output yielded at said second winding of said transformer to generate an output voltage;

a control circuit for operating said switching elements to generate the switching output at said second winding of said transformer, and controlling a switching phase-difference between said first and fourth switching elements or a switching phase-difference between said second and third switching elements to stabilize said output voltage of said output circuit; and an inductor inserted in a path ranging from said first connection point through said first winding to said second connection point to form a resonance circuit in conjunction with said capacitor, wherein the inductance value of said inductor is arranged to provide the output voltage of said output circuit larger than or equal to a rated value when the input voltage has a minimum value, the output current having a maximum value and said switching phase-difference being zero.

2. A switching power supply unit as defined in claim 1, wherein a dead time in which both of said first and second switching elements are turned off or a dead time in which both of said third and fourth switching elements are turned off, wherein the inductance value of said inductor are arranged to allow the voltage between the main electrodes of each of said switching elements to be clamped to said input voltage during said dead time, when said input voltage is a maximum value, and said output current is a minimum value.

3. A switching power supply unit as defined in the claim 2, wherein said dead time is arranged to prevent any resonance from arising again during said dead time, when said input voltage is the maximum value and said output current is the minimum value.

4. A switching power supply unit as defined in claim 1, wherein said inductor forming said resonance circuit is a variable inductor having an inductance value changed in response to the output current.

5. A switching power supply unit as defined in the claim 4, which satisfies the following formula, $$Lr \geq \frac{2 \cdot C \cdot V_{in}^2}{(n \cdot I_{out})^2}$$

where Lr(H) is a resonance inductance value including the leakage inductance of said transformer and the inductance value of said inductor; C (F) is a capacitance value of said capacitor; n is a turn ratio of said transformer; Vin (V) is the input voltage; and Iout (A) is the output current.

6. A switching power supply unit as defined in the claim 5, which satisfies the following formula, $$\left\{\frac{1}{\omega}\right\} \cdot \sin^{-1}\left\{\frac{V_{in}}{n \cdot I_{out} \cdot Z}\right\} + n \cdot I_{out} \cdot \cos(\omega \cdot T4) \cdot \frac{L_r}{V_{in}} > T_d$$

where w (rad/s) is an angular frequency of a resonance frequency fo; Z (Ω) is a characteristic impedance; T4 (s) is a time period between the time when a voltage is applied to the switching elements just before regeneratively returning an energy of a resonance inductor to an input source and the time when said voltage is clamped to the input voltage Vin; and Td is a dead time defined as a time arranged in the switching operation for preventing a short circuit between said DC input ends caused by the switching operation of said switching elements.

7. A switching power supply unit as defined in claim 4, wherein said inductor includes a core, wherein the inductance value of said inductor is changed in response to said output current by the magnetic-circuit characteristic of said core.

8. A switching power supply unit as defined in claim 4, wherein said inductor is controlled by a signal supplied from outside to change the inductance value of said inductor in response to said output current.

9. A switching power supply unit as defined in claim 1, wherein each of said switching elements is a MOS-FET, wherein said capacitor includes a parasitic capacity of said MOS-FET as at least part thereof, and said diode includes a parasitic diode of said MOS-FET as at least part thereof.

10. A switching power supply unit as defined in claim 1, wherein said output circuit includes an output rectifier circuit and an output smoothing circuit, said output rectifier circuit being a both-wave rectifying type and for rectifying the switching output yielded at said second winding of said transformer, said output smoothing circuit being a choke-input type and for smoothing the rectified output from said output rectifier circuit.

* * * * *